United States Patent
Komoda

(10) Patent No.: US 7,587,125 B2
(45) Date of Patent: Sep. 8, 2009

(54) REPRODUCING/RECORDING APPARATUS

(75) Inventor: Koichi Komoda, Niihama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1558 days.

(21) Appl. No.: 10/031,360

(22) PCT Filed: May 18, 2001

(86) PCT No.: PCT/JP01/04156

§ 371 (c)(1), (2), (4) Date: May 10, 2002

(87) PCT Pub. No.: WO01/89210

PCT Pub. Date: Nov. 22, 2001

(65) Prior Publication Data

US 2002/0150389 A1 Oct. 17, 2002

(30) Foreign Application Priority Data

May 19, 2000 (JP) ............................ 2000-148713

(51) Int. Cl.
| | |
|---|---|
| H04N 5/00 | (2006.01) |
| H04N 5/91 | (2006.01) |
| H04N 5/93 | (2006.01) |
| H04N 7/26 | (2006.01) |
| H04N 7/167 | (2006.01) |
| H04N 9/79 | (2006.01) |
| H04N 11/02 | (2006.01) |
| H04L 9/00 | (2006.01) |
| G11B 5/86 | (2006.01) |
| G11B 15/04 | (2006.01) |

(52) U.S. Cl. .............................. 386/94; 386/33; 386/45; 386/46; 386/52; 386/70; 386/81; 386/82; 386/112; 386/125; 360/15; 360/60; 380/201; 380/203; 705/51; 705/57; 713/161; 713/165

(58) Field of Classification Search ................... 386/94, 386/33, 45, 46, 52, 70, 81, 82, 112, 125; 360/60, 15; 380/201, 203, 204; 705/51, 705/57; 713/161, 165
See application file for complete search history.

(56) References Cited

U.S. PATENT DOCUMENTS

| | | | |
|---|---|---|---|
| 4,660,116 A | 4/1987 | Westfall et al. | |
| 4,975,898 A | 12/1990 | Yoshida | |
| 5,057,947 A | 10/1991 | Shimada | |
| 5,778,064 A * | 7/1998 | Kori et al. | ................... 380/203 |

(Continued)

FOREIGN PATENT DOCUMENTS

CA 2236387 11/1998

(Continued)

*Primary Examiner*—Thai Tran
*Assistant Examiner*—Syed Y Hasan
(74) *Attorney, Agent, or Firm*—Marjama Muldoon Blasiak & Sullivan LLP

(57) ABSTRACT

A playback unit (3) reproduces contents which are recorded on a video cassette tape (2), and a recording unit (6) records the contents on another video cassette tape (7) and, simultaneously, an erasing unit (5) erases the contents from the video cassette tape (2).

Thereby, the copy-inhibited contents recorded on the video cassette tape (2) can be transferred to the other video cassette tape (7) without copying the contents.

8 Claims, 14 Drawing Sheets

U.S. PATENT DOCUMENTS

| | | | | |
|---|---|---|---|---|
| 5,799,081 A * | 8/1998 | Kim et al. | | 380/203 |
| 5,822,425 A | 10/1998 | Ezaki et al. | | |
| 5,896,255 A | 4/1999 | Mardirossian | | |
| 6,427,047 B1 * | 7/2002 | Ogino | | 386/94 |
| 6,433,946 B2 * | 8/2002 | Ogino | | 360/60 |
| 6,480,607 B1 * | 11/2002 | Kori et al. | | 380/201 |
| 6,578,149 B1 * | 6/2003 | Kawamae et al. | | 726/26 |
| 6,810,200 B1 * | 10/2004 | Aoyama et al. | | 386/94 |
| 6,839,503 B1 * | 1/2005 | Hirai | | 386/94 |
| 6,847,950 B1 * | 1/2005 | Kamibayashi et al. | | 705/57 |
| 6,904,227 B1 * | 6/2005 | Yamamoto et al. | | 386/52 |

FOREIGN PATENT DOCUMENTS

| | | |
|---|---|---|
| EP | 0 878 794 A2 | 11/1998 |
| EP | 0 924 930 A2 | 6/1999 |
| EP | 0 969 462 A1 | 7/1999 |
| EP | 1 096 499 A2 | 5/2001 |
| JP | 9-130766 | 10/1998 |
| JP | 10-322648 | 11/1998 |
| JP | 11213552 A | 8/1999 |
| JP | 2000322826 A | 11/2000 |
| JP | 2001014221 A | 1/2001 |
| JP | 2001022647 A | 1/2001 |
| JP | 2001-125833 | 5/2001 |

* cited by examiner

Fig.9(a)

generated value G1 of d1~d5
= d5 × 100000000h+d4 × 1000000h+d3 × 10000h+d2 × 100h+d1

Fig.9(b)

total number T1 of unused generated values smaller than generated value G1
= d5 × K5+d4 × K4+d3 × K3+d2 × K2
where, K2=36 (28h)
$\qquad$ K3 = K2 × 220+K2 × 256 = 17136 (42F0h)
$\qquad$ K4 = K3 × 220+K2 × 256 × 256 = 6129216 (5D8640h)
$\qquad$ K5 = K4 × 220+K2 × 256 × 256 × 256 = 1952407296 (745F5F00h)

Fig.9(c)

image data (hexadecimal number) G2 after compression
= G1−T1
= d5 × 100000000h+d4 × 1000000h+d3 × 10000h+d2 × 100h+d1
  −(d5 × K5+d4 × K4+d3 × K3+d2 × K2)
= d5 × 8BA0A100h+d4 × A279C0h+d3 × BD10h+d2 × D8h+d1

Fig.11(a)

image data after compression=G2
L1 = quotient of G2÷220
L2 = quotient of L1÷220
L3 = quotient of L2÷220
L4 = quotient of L3÷220
(220=decimal number)

Fig.11(b)

generated value G1 of d1~d5(hex)
= G2+L1 × 36+L2 × 36 × 256+L3 × 36 × 256 × 256+L4 × 36 × 256 × 256 × 256
= G2+L1 × 24h+L2 × 2400h+L3 × 240000h+L3 × 24000000h

REPRODUCING/RECORDING APPARATUS

FIELD OF INVENTION

The present invention relates to playback of contents recorded on a storage medium, and recording and erasing of the contents on/from the storage medium and, more particularly, to a playback/recording apparatus which transfers copy-inhibited contents recorded on a storage medium to another storage medium while erasing the contents from the storage medium.

BACKGROUND OF THE INVENTION

In a conventional playback/recording apparatus, for example, copy-inhibited contents which are digital-recorded on a storage medium are hand Led such that copyright information thereof is detected, and only playback of the contents is carried out.

Furthermore, in the conventional playback/recording apparatus, with respect to copy-inhibited contents which are analog-recorded on a video cassette tape, even when a reproduced signal thereof is recorded on another video cassette tape, a reproduced image thereof is degraded in image quality by the effect of an analog protection system, which results in an image the viewer cannot view normally, whereby illegal copying is avoided.

For example, Japanese Published Patent Application No. Hei.9-130766 proposes methods of transferring and recording television signals and a recording apparatus, which will be described as a specific example of a prior art, with reference to FIG. 15. FIG. 15 is a diagram illustrating a signal format for transferring copy generation restriction information.

In the signal format, CGMS information is superimposed by utilizing a format of an extended data service (XDS) signal which is standardized in relation to a closed caption signal that is superimposed on the 21st line in a vertical blanking period of an analog television signal. The XDS signal is composed of a clock run-in period, a start bit, and a digital signal of 16 bits, and the digital signal is divided into two bytes for characters 1 and 2. The information based on the standard of the XDS signal and the CGMS information can be distinguished from each other by the start bit, and the character 1 and/or the character 2, whereby the recording apparatus identifies the CGMS information on the 21st line, and performs copy generation restriction.

As described above, with respect to copying of contents, the conventional playback/recording apparatus performs copying when the contents are not copyinhibited, and performs only playback when the contents are copy-inhibited. Further, it performs copy generation restriction on the basis of the copy generation restriction information.

Accordingly, for example, the viewer cannot transfer copy-inhibited contents recorded on an analog tape, to a digital tape for editing.

That is, an apparatus which is able to appropriately perform transfer of contents protected by copyright, has not yet been developed.

SUMMARY OF INVENTION

The present invention is made to solve the above-described problems and has for its object to provide a playback/recording apparatus which is able to perform transfer of contents recorded on a storage medium to another storage medium while erasing the contents from the original storage medium, when the contents are copy-inhibited.

According to claim 1 of the present invention, there is provided a playback/recording apparatus for performing transfer of contents recorded on an erasable storage medium, and the apparatus comprises: a playback means for reproducing contents recorded on a first storage medium, and outputting the contents; a detection means for detecting copyright information of the contents; an erasing means for erasing the contents from the first storage medium; and a recording means for recording the contents on a second storage medium; wherein, when performing transfer of the contents, the contents are reproduced by the playback means and outputted and, when the output of the detection means indicates that the contents are copy-inhibited, the contents are erased from the first storage medium by the erasing means and, simultaneously, the contents are recorded on the second storage medium by the recording means, thereby transferring the contents.

Therefore, when the copyright information of the contents recorded on the storage medium is "copy-inhibited", the contents on which a copy inhibition measurement is performed are erased from the storage medium when the storage medium is an erasable medium and, simultaneously, the contents which include the copyright information indicating "copy-inhibited" and are subjected to the copy inhibition measurement are recorded on another storage medium, whereby transfer of the contents can be carried out while avoiding that the same contents exist at the same time.

According to claim 2 of the present invention, there is provided a playback/recording apparatus for performing transfer of contents recorded on an erasable storage medium, and the apparatus comprises: a playback means for reproducing contents recorded on a first storage medium, and outputting the contents; a detection means for detecting copyright information of the contents; an erasing means for erasing the contents from the first storage medium; an encryption means for encrypting the output of the playback means, and outputting the encrypted data; a temporary storage means for temporarily storing the encrypted data; a decryption means for decrypting the encrypted data; and a recording means for recording the contents on a second storage medium; wherein, when performing transfer of the contents, the contents are reproduced by the playback means and outputted and, when the output of the detection means indicates that the contents are copy-inhibited, the contents are erased from the first storage medium by the erasing means and, simultaneously, the contents are encrypted by the encryption means and temporarily stored in the temporary storage means and, after the erasing is ended, the encrypted data stored in the temporary storage means are read and outputted, and the encrypted data are decrypted by the decryption means and outputted and, further, the encrypted data stored in the temporary storage means are erased, and the decrypted contents are recorded on the second storage medium by the recording means, thereby transferring the contents.

Therefore, when the case where the copyright information of the contents recorded on the storage medium is "copy-inhibited", the contents on which a copy inhibition measurement is performed are erased from the storage medium and simultaneously stored in the temporary storage means when the storage medium is an erasable medium, and thereafter, the contents which include the copyright information indicating "copy-inhibited" and are subjected to the copy inhibition measurement are recorded on another storage medium, whereby transfer of the contents can be carried out while avoiding that the same contents exist at the same time.

According to claim 3 of the present invention, there is provided a playback/recording apparatus for performing transfer of contents recorded on an erasable storage medium between apparatuses, and comprising a playback/erasing apparatus as a first apparatus, a recording apparatus as a second apparatus, and a transmission line such as a transmission cable or the like for connecting the first and second apparatuses; the first apparatus comprising: a first authentication means for performing mutual authentication with the second apparatus, and transfer of contents including transfer information which indicates transfer of the contents, or the like, between itself and the second apparatus; a playback means for reproducing contents recorded on a first storage medium, and outputting the reproduced contents; a detection means for detecting copyright information of the contents; an erasing means for erasing the contents from the first storage medium; and an analog protection system (APS) for incorporating analog protection, the transfer information, and the like into the output of the playback means; and the second apparatus comprising: a second authentication means for performing mutual authentication with the first apparatus, and transfer of the contents including the transfer information, between itself and the first apparatus; and a recording means for recording the contents on a second storage medium; wherein, when performing transfer of the contents, mutual authentication is carried out between the first authentication means and the second authentication means, and the contents are reproduced by the playback means and outputted and, when the output of the detection means indicates that the contents are copy-inhibited, the analog protection, the transfer information, and the like are incorporated into the output of the playback means by the APS, and the contents are erased from the first storage medium by the erasing means and, simultaneously, the transfer information is detected by the second authentication means, and the contents are recorded on the second storage medium by the recording means on the basis of the transfer information, thereby transferring the contents.

Therefore, when the copyright information of the contents recorded on the storage medium is "copy-inhibited", the contents on which a copy inhibition measurement is performed are erased from the storage medium when the storage medium is an erasable medium, and the transfer information is assigned to vacant bits of CGMS information and analog-transferred between the apparatuses, and the contents which include the copyright information indicating "copy-inhibited" and are subjected to the copy inhibition measurement are recorded on another storage medium, whereby transfer of the contents can be carried out while avoiding that the same contents exist at the same time.

According to claim 4 of the present invention, in the playback/recording apparatus defined in claim 3, information such as the transfer information indicating transfer of the contents exists in a vertical blanking period of a video signal.

Therefore, the contents are made to have the transfer information, whereby the contents can be analog-transferred between the apparatuses which have performed mutual authentication.

According to claim 5 of the present invention, in the playback/recording apparatus defined in claim 3, the second storage medium is a video cassette tape; and an analog protection signal is superimposed and recorded on the contents.

Therefore, the contents which have been transferred to another video cassette tape can be subjected to copy protection. playback/recording apparatus for performing transfer of contents recorded on an erasable storage medium between apparatuses, and comprising a playback/erasing apparatus as a first apparatus, a recording apparatus as a second apparatus, and a transmission line such as a transmission cable or the like for connecting the first and second apparatuses; the first apparatus comprising: a first authentication means for performing mutual authentication and transfer of contents between itself and the second apparatus; a playback means for reproducing contents recorded on a first storage medium, and outputting the reproduced contents; a detection means for detecting copyright information of the contents; an erasing means for erasing the contents from the first storage medium; and an encryption means for encrypting the output from the playback means, and outputting the encrypted data; and the second apparatus comprising: a second authentication means for performing mutual authentication and transfer of contents between itself and the first apparatus; a decryption means for decrypting the encrypted data; and a recording means for recording the contents on a second storage means; wherein, when performing transfer of the contents, mutual authentication is carried out between the first authentication means and the second authentication means, the contents are reproduced by the playback means and outputted and, when the output of the detection means indicates that the contents are copy-inhibited, data of the contents are encrypted by the encryption means and outputted, the contents are erased from the first storage medium by the erasing means, the encrypted data are decrypted by the decryption means and outputted, and the contents are recorded on the second storage means by the recording means, thereby transferring the contents.

Therefore, when the copyright information of the contents recorded on the storage medium is "copy-inhibited", the contents on which a copy inhibition measurement is performed are erased from the storage medium when the storage medium is an erasable medium, and the contents are encrypted and digital-transferred together with the transfer information between the apparatuses which have performed mutual authentication and, after the contents are decrypted, the contents which include the copyright information indicating "copy-inhibited" and are subjected to the copy inhibition measurement are recorded on another storage medium, whereby transfer of the contents can be carried out while avoiding that the same contents exist at the same time.

According to claim 7 of the present invention, there is provided a playback/recording apparatus for performing transfer of contents recorded on an erasable storage medium between apparatuses, and comprising a playback/erasing apparatus as a first apparatus, a recording apparatus as a second apparatus, and a transmission line such as a transmission cable or the like for connecting the first and second apparatuses; the first apparatus comprising: a first authentication means for performing mutual authentication with the second apparatus, and transfer of contents including transfer information which indicates transfer of the contents, or the like, between itself and the second apparatus; a playback means for reproducing contents recorded on a first storage medium, and outputting the reproduced contents; a detection means for detecting copyright information of the contents; an erasing means for erasing the contents from the first storage medium; a compression means for compressing image data of the contents, and outputting the compressed data; and an encryption means for encrypting the output from the playback means, and outputting the encrypted data; and the second apparatus comprising: a second authentication means for performing mutual authentication with the first apparatus, and transfer of contents including transfer information which indicates transfer of the contents, or the like, between itself and the first apparatus; a decryption means for decrypting the encrypted data; a decompression means for decompressing the compressed data; and a recording means for recording the contents on a second storage means; wherein, when performing transfer of the contents, mutual authentication is carried out between the first authentication means and the second authentication means, the contents are reproduced by the playback means and outputted and, when the output of the detection means indicates that the contents are copy-inhibited, image data of the contents are compressed by the compression means and, simultaneously, additional information such as the copyright information, the transfer information and the like are inserted in an area which is secured by the compression, the data of the contents are encrypted by the encryption means and outputted, the contents are erased from the first storage medium by the erasing means and, when the additional information including the transfer information is detected by the second authentication means, the encrypted data are decrypted by the decryption means, the compressed data are decompressed by the decompression means to output the image data, and the contents are recorded on the second storage means by the recording means, thereby transferring the contents.

Therefore, when the copyright information of the contents recorded on the storage medium is "copy-inhibited", the contents on which a copy inhibition measurement is performed are erased from the storage medium when the storage medium is an erasable medium, and the uncompressed digital image data included in the contents are compressed so that the additional information including the transfer information of the contents can be added, and thereafter, the compressed data are encrypted, digital-transferred between the apparatuses which have performed mutual authentication, decrypted, and decompressed, and thereafter, the contents which include the copyright information indicating "copy-inhibited" and are subjected to the copy inhibition measurement are recorded on another storage medium, whereby transfer of the contents can be carried out while avoiding that the same contents exist at the same time.

According to claim 8 of the present invention, in the playback/recording apparatus defined in claim 7, the compression means is a means for compressing data by reducing a total number T of unused generated values which are smaller than a generated value G; the generated value G is a value which is generated by arranging plural data values so as to have digits, among data where the total number of data values to be used as data values within the contents is less than the total number of values expressed by a number of bits per data value, i.e., among data having values not to be used as data values; the unused generated values are values which include the unused data values and are generated by arranging plural data values so as to have digits; and the plural data values are made to have the same number of digits by adding 0 until reaching a number of digits of a maximum data value.

Therefore, an area, where the additional information inchlding the transfer information of the contents is to be inserted, can be secured, whereby the contents can be transferred without increasing the transfer rate.

According to claim 9 of the present invention, in the playback/recording apparatus defined in claim 7, the decompression means is a means for decompressing the compressed data by calculating the total number T of unused generated values which are smaller than a generated value G, and adding it to the generated value G; the generated value G is a value which is generated by arranging plural data values so as to have digits, among data where the total number of data values to be used as data values within the contents is less than the total number of values expressed by a number of bits per data value, i.e., among data having values not to be used as data values; the unused generated values are values which include the unused data values and are generated by arranging plural data values so as to have digits; and the plural data values are made to have the same number of digits by adding 0 until reaching a number of digits of a maximum data value.

Therefore, the compressed digital data can be decompressed to restore the original digital data.

According to claim 10 of the present invention, there is provided a playback/erasing apparatus as a first apparatus, which is one of components of a playback/recording apparatus for performing transfer of contents recorded on an erasable storage medium, between the first apparatus and a second apparatus, and the playback/erasing apparatus comprises: a first authentication means for performing mutual authentication and transfer of contents between itself and the second apparatus; a playback means for reproducing contents recorded on a first storage medium, and outputting the reproduced contents; a detection means for detecting copyright information of the contents; and an erasing means for erasing the contents from the first storage medium; wherein, when performing transfer of the contents, mutual authentication is carried out between the first authentication means and the second apparatus, and the contents are reproduced by the playback means and outputted and, when the output of the detection means indicates that the contents are copy-inhibited, the contents are erased from the first storage medium by the erasing means.

Therefore, when the contents recorded on the storage medium are copy-inhibited, the contents are erased from the storage medium when the storage medium is an erasable medium, and transferred to an external apparatus which has performed mutual authentication, whereby the contents can be transferred while avoiding that the same contents exist at the same time.

According to claim 11 of the present invention, there is provided a playback/erasing apparatus as a first apparatus, which is one of components of a playback/recording apparatus for performing transfer of contents recorded on an erasable storage medium, between the first apparatus and a second apparatus, and the playback/erasing apparatus comprises: a first authentication means for performing mutual authentication with the second apparatus, and transfer of contents including transfer information which indicates transfer of the contents, or the like, between itself and the second apparatus; a playback means for reproducing contents recorded on a first storage medium, and outputting the reproduced contents; a detection means for detecting copyright information of the contents; an erasing means for erasing the contents from the first storage medium; and an analog protection system (APS) for incorporating analog protection and the transfer information or the like into the output of the playback means; wherein, when performing transfer of the contents, mutual authentication is carried out between the first authentication means and the second apparatus, and the contents are reproduced by the playback means and outputted and, when the output of the detection means indicates that the contents are copy-inhibited, the analog protection and the transfer information or the like are incorporated into the output of the playback means by the APS, and the contents are erased from the first storage medium by the erasing means.

Therefore, when the contents recorded on the storage medium are copy-inhibited, the contents are erased from the storage medium when the storage medium is an erasable medium, and the transfer information is assigned to vacant bits of CGMS information and the APS is incorporated into the contents, and the contents can be analog-transferred to an external apparatus with which the first apparatus has performed mutual authentication, whereby the contents can be transferred while avoiding that the same contents exist at the same time.

According to claim 12 of the present invention, in the playback/erasing apparatus as the first apparatus defined in claim 11, the information such as transfer information indicating transfer of the contents exists in a vertical blanking period of a video signal.

Therefore, the contents are made to have the transfer information, and the contents can be analog-transferred to an external apparatus which has performed mutual authentication.

According to claim 13 of the present invention, there is provided a playback/erasing apparatus as a first apparatus, which is one of components of a playback/recording apparatus for performing transfer of contents recorded on an erasable storage medium, between the first apparatus and a second apparatus, and the playback/erasing apparatus comprises: a first authentication means for performing mutual authentication and transfer of contents between itself and the second apparatus; a playback means for reproducing contents recorded on a first storage medium, and outputting the reproduced contents; a detection means for detecting copyright information of the contents; an erasing means for erasing the contents from the first storage medium; and an encryption means for encrypting the output of the playback means, and outputting the encrypted data; wherein, when performing transfer of the contents, mutual authentication is carried out between the first authentication means and the second apparatus, and the contents are reproduced by the playback means and outputted and, when the output of the detection means indicates that the contents are copy-inhibited, the data of the contents are encrypted by the encryption means and outputted, and the contents are erased from the first storage medium by the erasing means.

Therefore, when the contents recorded on the storage medium are copy-inhibited, the contents are erased from the storage medium when the storage medium is an erasable medium, and the contents are encrypted and digital-transferred together with the transfer information to an external apparatus which has performed mutual authentication, whereby the contents can be transferred while avoiding that the same contents exist at the same time.

According to claim 14 of the present invention, there is provided a playback/erasing apparatus as a first apparatus, which is one of components of a playback/recording apparatus for performing transfer of contents recorded on an erasable storage medium, between the first apparatus and a second apparatus, and the playback/erasing apparatus comprises: a first authentication means for performing mutual authentication with the second apparatus, and transfer of contents including transfer information which indicates transfer of the contents, or the like, between itself and the second apparatus; a playback means for reproducing contents recorded on a first storage medium, and outputting the reproduced contents; a detection means for detecting copyright information of the contents; an erasing means for erasing the contents from the first storage medium; a compression means for compressing image data of the contents, and outputting the compressed data; and an encryption means for encrypting the output of the playback means, and outputting the encrypted data; wherein, when performing transfer of the contents, mutual authentication is carried out between the first authentication means and the second apparatus, and the contents are reproduced by the playback means and outputted and, when the output of the detection means indicates that the contents are copy-inhibited, the image data of the contents are compressed by the compression means and additional information such as the copyright information, the transfer information and the like are inserted in an area which is secured by the compression, the data of the contents are encrypted by the encryption means and outputted, and the contents are erased from the first storage medium by the erasing means.

Therefore, when the contents recorded on the storage medium are copy-inhibited, the contents are erased from the storage medium when the storage medium is an erasable medium, and the uncompressed digital image data included in the contents are compressed so that the additional information including the transfer information of the contents can be added, and thereafter, the contents are encrypted and digital-transferred to an external apparatus which has performed mutual authentication, whereby transfer of the contents can be carried out while avoiding that the same contents exist at the same time.

According to claim 15 of the present invention, in the playback/erasing apparatus as the first apparatus defined in claim 14, the compression means is a means for compressing data by reducing a total number T of unused generated values which are smaller than a generated value G; the generated value G is a value which is generated by arranging plural data values so as to have digits, among data where the total number of data values to be used as data values within the contents is less than the total number of values expressed by a number of bits per data value, i.e., among data having values not to be used as data values; the unused generated values are values which include the unused data values and are generated by arranging plural data values so as to have digits; and the plural data values are made to have the same number of digits by adding 0 until reaching a number of digits of a maximum data value.

Therefore, an area, where the additional information including the transfer information of the contents is to be inserted, can be secured, whereby the contents can be transferred without increasing the transfer rate.

According to claim 16 of the present invention, there is provided a recording apparatus as a second apparatus, which is one of components of a playback/recording apparatus for performing transfer of contents recorded on an erasable storage medium between a first apparatus and the second apparatus, and the recording apparatus comprises: a second authentication means for performing mutual authentication with the first apparatus, and transfer of contents including transfer information which indicates transfer of the contents, or the like, between itself and the first apparatus; and a recording means for recording the contents on a second storage medium; wherein, when performing transfer of the contents, mutual authentication is carried out between the second authentication means and the first apparatus, the transfer information is detected by the second authentication means, and the contents are recorded on the second storage means by the recording means on the basis of the transfer information.

Therefore, the copy-inhibited contents transferred from an external apparatus which has performed mutual authentication, which contents include the copyright information indicating "copy-inhibited" and are subjected to the copy inhibition measurement, can be transferred to another storage medium, whereby transfer of the contents can be carried out while avoiding that the same contents exist at the same time.

According to claim 17 of the present invention, in the recording apparatus as the second apparatus defined in claim 16, the second storage medium is a video cassette tape, and an analog protection signal is superimposed and recorded on the contents.

Therefore, the contents which have been transferred to another video cassette tape can be subjected to copy protection.

According to claim 18 of the present invention, there is provided a recording apparatus as a second apparatus, which is one of components of a playback/recording apparatus for performing transfer of contents recorded on an erasable storage medium between a first apparatus and the second apparatus, and the recording apparatus comprises: a second authentication means for performing mutual authentication and transfer of contents between itself and the first apparatus; a decryption means for decrypting encrypted data; and a recording means for recording the contents on a second storage medium; wherein, when performing transfer of the contents, mutual authentication is carried out between the second authentication means and the first apparatus, encrypted data are decrypted by the decryption means and outputted, and the contents are recorded on the second storage means by the recording means.

Therefore, after the encrypted contents transferred from an external apparatus which has performed mutual authentication are decrypted, the contents which include the copyright information indicating "copy-inhibited" and are subjected to a copy inhibition measurement can be recorded on another storage medium, whereby transfer of the contents can be carried out while avoiding that the same contents exist at the same time.

According to claim 19 of the present invention, there is provided a recording apparatus as a second apparatus, which is one of components of a playback/recording apparatus for performing transfer of contents recorded on an erasable storage medium between a first apparatus and the second apparatus, and the recording apparatus comprises: a second authentication means for performing mutual authentication with the first apparatus, and transfer of contents including transfer information which indicates transfer of the contents, or the like, between itself and the first apparatus; a decompression means for decompressing compressed data; and a recording means for recording the contents on a second storage medium; wherein, when performing transfer of the contents, mutual authentication is carried out between the second authentication means and the first apparatus and, when additional information including the transfer information and the like is detected by the second authentication means, encrypted data are decrypted by the decryption means and outputted, compressed data are decompressed by the decompression means to output the contents, and the contents are recorded on the second storage means by the recording means.

Therefore, after the compressed and encrypted contents transferred from an external apparatus which has performed mutual authentication are decrypted and decompressed, the contents which include the copyright information indicating "copy-inhibited" and are subjected to a copy inhibition measurement can be recorded on another storage medium, whereby transfer of the contents can be carried out while avoiding that the same contents exist at the same time.

According to claim 20 of the present invention, in the recording apparatus as the second apparatus defined in claim 19, the decompression means is a means for decompressing the compressed data by calculating the total number T of unused generated values which are smaller than a generated value G, and adding it to the generated value G; the generated value G is a value which is generated by arranging plural data values so as to have digits, among data where the total number of data values to be used as data values within the contents is less than the total number of values expressed by a number of bits per data value, i.e., among data having values not to be used as data values; the unused generated values are values which include the unused data values and are generated by arranging plural data values so as to have digits; and the plural data values are made to have the same number of digits by adding 0 until reaching a number of digits of a maximum data value.

Therefore, the compressed digital data can be decompressed to restore the original digital data.

According to claim 21 of the present invention, the playback/recording apparatus defined in claim 6 or 7 further comprises a temporary storage means for temporarily storing the contents; and the contents are temporarily stored in the temporary storage means.

Therefore, the contents can be continuously transferred with efficiency.

According to claim 22 of the present invention, the playback/erasing apparatus as the first apparatus defined in claim 13 or 14 further comprises a temporary storage means for temporarily storing the contents; and the contents are temporarily stored in the temporary storage means.

Therefore, the contents can be continuously transferred with efficiency.

According to claim 23 of the present invention, the recording apparatus as the second apparatus defined in claim 18 or 19 further comprises a temporary storage means for temporarily storing the contents; and the contents are temporarily stored in the temporary storage means.

Therefore, the contents can be continuously transferred with efficiency.

According to claim 24 of the present invention, the playback/recording apparatus defined in claim 1 or 2 further comprises: a second playback means for reproducing the contents recorded on the second storage medium; and a control means for controlling the playback means or the erasing means, the second playback means, and the recording means; wherein the playback means or the erasing means, the second playback means, and the recording means are controlled by the control means on the basis of transfer information including information of collation between a recording signal to the second storage medium and a reproduced signal from the second storage medium, or the like, thereby performing transfer of the contents.

Therefore, the contents transfer process can be controlled by reproducing the data recorded on another storage medium and comparing the recorded signal with the reproduced signal, whereby normal transfer of the contents can be carried out.

According to claim 25 of the present invention, the playback/recording apparatus defined in any of claims 3, 6, and 7 further comprises: a second playback means for reproducing the contents recorded on the second storage medium; a first control means for controlling the playback means and the erasing means; and a second control means for controlling the second playback means and the recording means; wherein the playback means or the erasing means, the second playback means, and the recording means are controlled by the first control means or the second control means, on the basis of transfer information including information of collation between a recording signal to the second storage medium and a reproduced signal from the second storage medium, or the like, thereby performing transfer of the contents.

Therefore, the contents transfer process can be controlled between the apparatuses which have performed mutual authentication, by reproducing the data recorded on another storage medium and comparing the recorded signal with the reproduced signal, whereby normal transfer of the contents can be carried out.

According to claim 26 of the present invention, the playback/erasing apparatus as the first apparatus defined in any of claims 10, 11, 13, and 14 further comprises a first control means for controlling the playback means and the erasing means; and the playback means and the erasing means are controlled by the first control means, thereby performing transfer of the contents.

Therefore, the contents transfer process can be controlled, and transfer of the contents can be stopped.

According to claim 27 of the present invention, the recording apparatus as the second apparatus defined in any of claims 16, 18, and 19 further comprises: a second playback means for reproducing the contents recorded on the second storage means; and a second control means for controlling the second playback means and the recording means; wherein the second playback means and the recording means are controlled by the second control means on the basis of transfer information including information of collation between a recording signal to the second storage medium and a reproduced signal from the second storage medium, or the like, thereby performing transfer of the contents.

Therefore, the contents transfer process can be controlled between the apparatuses which have performed mutual authentication, by reproducing the data recorded on another storage medium and comparing the recorded signal with the reproduced signal, whereby normal transfer of the contents can be carried out.

According to claim 28 of the present invention, in the playback/recording apparatus defined in any of claims 3, 6, and 7, mutual authentication by the first authentication means or the second authentication means is also carried out during transfer of the contents, and the transfer of the contents is contimied when mutual authentication is established.

Therefore, transfer of the contents can be carried out only when transfer of the contents is permitted between the apparatuses which have performed mutual authentication.

According to claim 29 of the present invention, in the playback/erasing apparatus as the first apparatus defined in any of claims 10, 11, 13, and 14, mutual authentication by the first authentication means is also carried out during transfer of the contents, and the transfer of the contents is continued when mutual authentication is established.

Therefore, the contents can be transferred to an external apparatus which has performed mutual authentication, only when transfer of the contents is permitted.

According to claim 30 of the present invention, in the recording apparatus as the second apparatus defined in any of claims 16, 18, and 19, mutual authentication by the second authentication means is also carried out during transfer of the contents, and the transfer of the contents is continued when mutual authentication is established.

Therefore, the contents transferred from an external apparatus which has performed mutual authentication, can be recorded only when transfer of the contents is permitted.

According to claim 31 of the present invention, in the playback/recording apparatus defined in claim 25, the contents are divided into plural sections, and transfer of the contents is carried out in units of sections.

Therefore, transfer of the contents can be carried out with stability, in units of sections, between the apparatuses which have performed mutual authentication.

According to claim 32 of the present invention, in the playback/erasing apparatus as the first apparatus defined in claim 26, the contents are divided into plural sections, and transfer of the contents is carried out in units of sections.

Therefore, the contents can be transferred in units of sections, to an external apparatus which has performed mutual authentication.

According to claim 33 of the present invention, in the recording apparatus as the second apparatus defined in claim 27, the contents are divided into plural sections, and transfer of the contents is carried out in units of sections.

Therefore, the contents transferred from an external apparatus which has performed mutual authentication, can be recorded in units of sections on another storage medium.

According to claim 34 of the present invention, in the playback/recording apparatus defined in claim 31, when performing transfer of the contents, the recording position of the contents on the second storage medium matches the erasing position of the contents on the first storage medium.

Therefore, transfer of copy-inhibited contents, such as a still picture, can be appropriately carried out between the apparatuses which have performed mutual authentication.

According to claim 35 of the present invention, in the playback/erasing apparatus as the first apparatus defined in claim 32, when performing transfer of the contents, the erasing position of the contents on the first storage medium matches the recording position of the contents on the second storage medium of the external apparatus.

Therefore, copy-inhibited contents, such as a still picture, can be appropriately transferred to an external apparatus which has performed mutual authentication.

According to claim 36 of the present invention, in the recording apparatus as the second apparatus defined in claim 33, when performing transfer of the contents, the recording position of the contents on the second storage medium matches the erasing position of the contents on the first storage medium of the external apparatus.

Therefore, copy-inhibited contents, such as a still picture, transferred from an external apparatus which has performed mutual authentication, can be appropriately recorded.

According to claim 37 of the present invention, the playback/recording apparatus defined in claim 24 further comprises a nonvolatile memory for recording and holding information relating to contents transfer, such as the transfer information or the copyright information, when transfer of the contents is carried out; and the transfer process is continued when the transfer information exists in the nonvolatile memory, and the information is erased when the transfer is ended, whereby, even when the contents transfer process is interrupted clue to power off of the playback/recording apparatus or the like, the transfer process can be resumed by reading the transfer information from the memory.

Therefore, even when transfer of the contents is interrupted during the transfer, the transfer information can be obtained from the nonvolatile memory, whereby transfer of the contents can be resumed or continued.

According to claim 38 of the present invention, the playback/recording apparatus defined in claim 25 further comprises a nonvolatile memory for recording and holding information relating to contents transfer, such as the transfer information or the copyright information, the information indicating division of the contents, and the like, when transfer of the contents is carried out; and the transfer process is continued when the transfer information exists in the nonvolatile memory, and the information is erased when the transfer is ended, whereby, even when the contents transfer process is interrupted due to power off of the playback/recording apparatus or the like, the transfer process can be resumed by reading the transfer information from the memory.

Therefore, even when transfer of the contents is interrupted during the transfer between the apparatuses which have performed mutual authentication, the transfer information can be obtained from the nonvolatile memory, whereby transfer of the contents can be resumed or continued.

According to claim 39 of the present invention, the playback/erasing apparatus as the first apparatus defined in claim 26 further comprises a nonvolatile memory for recording and holding information relating to contents transfer, such as the transfer information or the copyright information, the information indicating division of the contents, and the like, when transfer of the contents is carried out; and the transfer process is continued when the transfer information exists in the nonvolatile memory, and the information is erased when the transfer is ended, whereby, even when the contents transfer process is interrupted due to power off of the playback/recording apparatus or the like, the transfer process can be resumed by reading the transfer information from the memory.

Therefore, even when transfer of the contents to an external apparatus which has performed mutual authentication is interrupted during the transfer, the transfer information can be obtained from the nonvolatile memory, whereby transfer of the contents can be resumed or continued.

According to claim 40 of the present invention, the playback/recording apparatus defined in claim 1 or 2 further comprises a transfer instruction means for sending an instruction for transferring the contents, to the playback/recording apparatus; and transfer of the contents is carried out according to the instruction of the transfer instruction means.

Therefore, the instruction for transferring the contents can be sent to the playback/recording apparatus.

According to claim 41 of the present invention, the playback/recording apparatus defined in any of claims 3, 6, and 7 further comprises a transfer instruction means for sending an instruction for transferring the contents, to the first apparatus; and transfer of the contents is carried out according to the instruction of the transfer instruction means.

Therefore, the instruction for transferring the contents can be sent to the first apparatus in the playback/recording apparatus.

According to claim 42 of the present invention, the playback/erasing apparatus as the first apparatus defined in any of claims 10, 11, 13, and 14 further comprises a transfer instruction means for sending an instruction for transferring the contents, to the first apparatus; and transfer of the contents is carried out according to the instruction of the transfer instruction means.

Therefore, the instruction for transferring the contents can be sent to the first apparatus.

According to claim 43 of the present invention, the playback/recording apparatus defined in claim 1 or 2 further comprises a transfer display means for displaying whether the contents are being transferred or not; and., when the contents are being transferred, it is displayed by the transfer display means for the outside of the apparatus.

Therefore, the playback/recording apparatus can notify the viewer that the contents are being transferred.

According to claim 44 of the present invention, in the playback/recording apparatus defined in any of claims 3, 6, and 7, the first apparatus is provided with a transfer display means for displaying whether the contents are being transferred or not; and, when the contents are being transferred, it is displayed by the transfer display means for the outside of the apparatus.

Therefore, the playback/recording apparatus can notify the viewer that the contents are being transferred to an external apparatus which has performed mutual authentication.

According to claim 45 of the present invention, the playback/erasing apparatus as the first apparatus defined in any of claims 10, 11, 13, and 14 further comprises a transfer display means for displaying whether the contents are being transferred or not; and, when the contents are being transferred, it is displayed by the transfer display means for the outside of the apparatus.

Therefore, the playback/recording apparatus can notify the viewer that the contents are being transferred to an external apparatus which has performed mutual authentication.

According to claim 46 of the present invention, there is provided a storage medium or a removable storage medium having information indicating whether transfer of contents is permitted or not, on which transfer of contents is carried out by the playback/recording apparatus, or the playback/erasing apparatus as the first apparatus, or the recording apparatus as the second apparatus, which is defined in any of claims 1 to 45.

Therefore, transfer of the contents can be controlled by detecting information which indicates whether transfer of the contents is permitted or not, or information which indicates whether transfer of the contents is permitted or not according to a difference in media types or storage modes between the transmitter and the receiver.

According to claim 47 of the present invention, there is provided a playback/erasing apparatus as a first apparatus in a playback/recording apparatus having a compression means for compressing data by reducing a total number T of unused generated values which are smaller than a generated value G; the generated value G is a value which is generated by arranging plural data values so as to have digits, among data where the total number of data values to be used as data values within the contents is less than the total number of values expressed by a number of bits per data value, i.e., among data having values not to be used as data values; the unused generated values are values which include the unused data values and are generated by arranging plural data values so as to have digits; the plural data values are made to have the same number of digits by adding 0 until reaching a number of digits of a maximum data value; and a data area is secured by the data compression of the compression means so as to perform insertion of additional information such as copyright information and transfer information, or the like.

Therefore, an area, where the additional information including the transfer information of the contents is to be inserted, can be secured, whereby the contents can be transferred without increasing the transfer rate.

According to claim 48 of the present invention, there is provided a recording apparatus as a second apparatus in a playback/recording apparatus having a decompression means for decompressing compressed data by calculating the total number T of unused generated values which are smaller than a generated value G, and adding it to the generated value G; the generated value G is a value which is generated by arranging plural data values so as to have digits, among data where the total number of data values to be used as data values within the contents is less than the total number of values expressed by a number of bits per data value, i.e., among data having values not to be used as data values; the unused generated values are values which include the unused data values and are generated by arranging plural data values so as to have digits; the plural data values are made to have the same number of digits by adding 0 until reaching a number of digits of a maximum data value; and the compressed data are decompressed by the decompression means.

Therefore, the compressed digital data can be decompressed to restore the original data.

According to claim 49 of the present invention, in the playback/recording apparatus defined in claim 31, division of the contents is performed by periodic counting of time which is possessed by the playback/recording apparatus, when the first storage medium is a video cassette tape; and it is performed in byte units of the contents stored in the first storage medium, when the first storage medium is a magnetic disk, an optical disk, a magneto-optic disk, or the like.

Therefore, the contents can be divided into plural sections, and the contents can be transferred in units of sections between the apparatuses which have performed mutual authentication.

According to claim 50 of the present invention, in the playback/erasing apparatus as the first apparatus defined in claim 32, division of the contents is performed by periodic counting of time which is possessed by the playback/erasing apparatus, when the first storage medium is a video cassette tape; and it is performed in byte units of the contents stored in the first storage medium, when the first storage medium is a magnetic disk, an optical disk, a magneto-optic disk, or the like.

Therefore, the contents can be divided into plural sections, and the contents can be transferred in units of sections to an external apparatus which has performed mutual authentication.

According to claim 51 of the present invention, in the recording apparatus as the second apparatus defined in claim 33, division of the contents is performed by periodic counting of time which is possessed by the recording apparatus, when the second storage medium is a video cassette tape; and it is performed in byte units of the contents stored in the first storage medium, when the first storage medium is a magnetic disk, an optical disk, a magneto-optic disk, or the like.

Therefore, the contents can be divided into plural sections, and the contents transferred from an external apparatus which has performed mutual authentication can be recorded in units of sections on another storage medium.

The playback/recording apparatus according to the present invention is useful as means for transferring copy-inhibited contents recorded on a storage medium to another storage medium without copying it.

BRIEF DESCRIPTION OF THE DRAWINGS

FIG. 9 is a diagram illustrating computational expressions for data compression according to the fifth embodiment of the present invention.

FIG. 11 is a diagram illustrating computational expressions for data decompression according to the fifth embodiment of the present invention.

DETAILED DESCRIPTION OF THE INVENTION

Hereinafter, a first embodiment of the present invention will be described.

Figure 1:
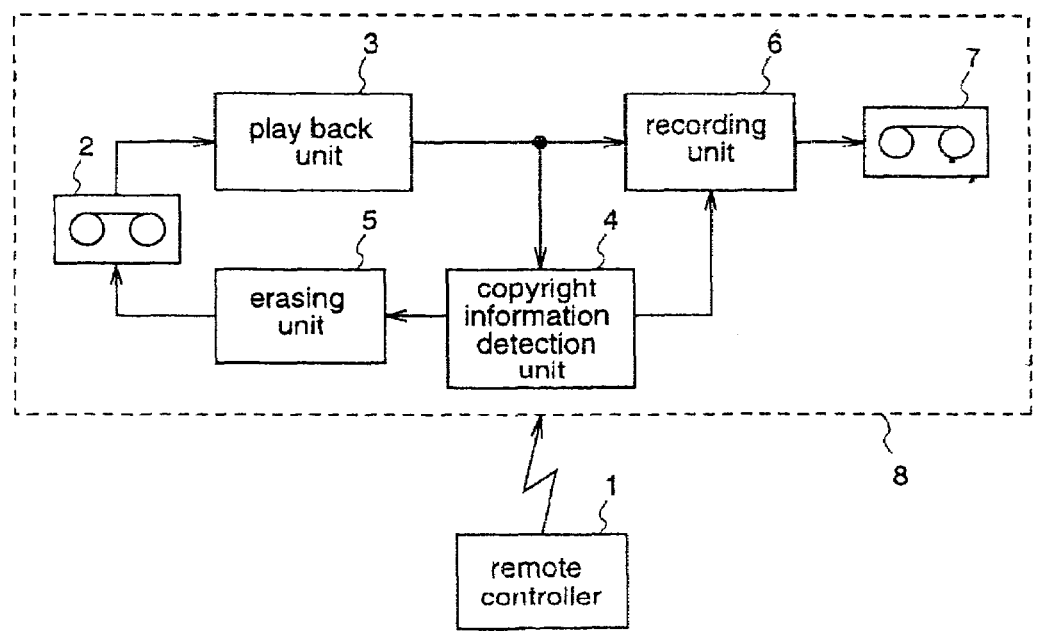
FIG. 1 is a block diagram illustrating a playback/recording apparatus according to a first embodiment of the present invention.

Initially, the structure of a playback/recording apparatus according to the first embodiment will be described with reference to FIG. 1. FIG. 1 is a block diagram illustrating a playback/recording apparatus according to the first embodiment. In the figure, a playback/recording apparatus 8 is composed of an erasable video cassette tape 2 on which contents are recorded, a video cassette tape 7 to which the contents are to be transferred, a playback unit 3, a copyright information detection unit 4, an erasing unit 5, and a recording unit 6. When the apparatus receives an instruction for transferring the contents, from a remote controller 1 which is a transfer instruction means, the apparatus transfers the contents recorded on the erasable video cassette tape 2 to another video cassette tape 7.

The playback unit 3 reproduces the contents recorded on the video cassette tape 2, and outputs an audio signal and a video signal.

The copyright information detection unit 4 detects copyright information of the contents.

When the copyright information detection unit 4 detects that the contents are copy-inhibited, the recording unit 6 superimposes a signal on the video signal which is reproduced by the playback unit 3 and, thereafter, records the video signal as well as the audio signal on the video cassette tape 7.

The erasing unit 5 erases the contents reproduced by the playback unit 3.

Next, a description will be given of the operation of the playback/recording apparatus according to the first embodiment.

When the playback/recording apparatus 8 receives an instruction for transferring the contents, from the remote controller 1, the playback unit 3 reproduces the contents recorded on the erasable video cassette tape 2, and outputs the audio signal and the video signal to the copyright information detection unit 4. The copyright information detection unit 4 detects whether the contents are subjected to analog protection or not, from the video signal supplied from the playback unit 3. In this detection, the detection unit 4 observes the vertical blanking period of the video signal, and decides that the contents are copy-inhibited when there is a pseudo sync pulse that causes an AGC of the recording unit 6 to malfunction.

When the copyright information detection unit 4 decides that the contents recorded on the video cassette tape 2 are copy-inhibited, the recording unit 6 detects that the contents are copy-inhibited from the output of the copyright information detection unit 4, and superimposes an analog protection signal detected by the copyright information detection unit 4 on the video signal outputted from the playback unit 3 and, further, records the video signal together with the audio signal on the video cassette tape 7, under the state where, for copy protection, setting is changed to a time constant of the AGC, which is not affected by the analog protection signal. Further, the erasing unit immediately erases the signal reproduced by the playback unit 3, from the video cassette tape 2.

As described above, in the playback/recording apparatus according to the first embodiment, when the copyright information of the contents which are analog-recorded on the erasable video cassette tape 2 is "copy-inhibited", the contents which include the copyright information indicating "copy-inhibited" and are in the copy-inhibited state are erased from the video cassette tape and, simultaneously, the contents are recorded on the other video cassette tape 7. Therefore, the copy-inhibited contents which are analog-recorded on the video cassette tape 2 can be transferred to the other video cassette tape 7 while preventing that the same contents exist at the same time.

Hereinafter, a second embodiment of the present invention will be described.

Initially, the structure of a playback/recording apparatus according to the second embodiment will be described with reference to FIG. 2.

Figure 2:
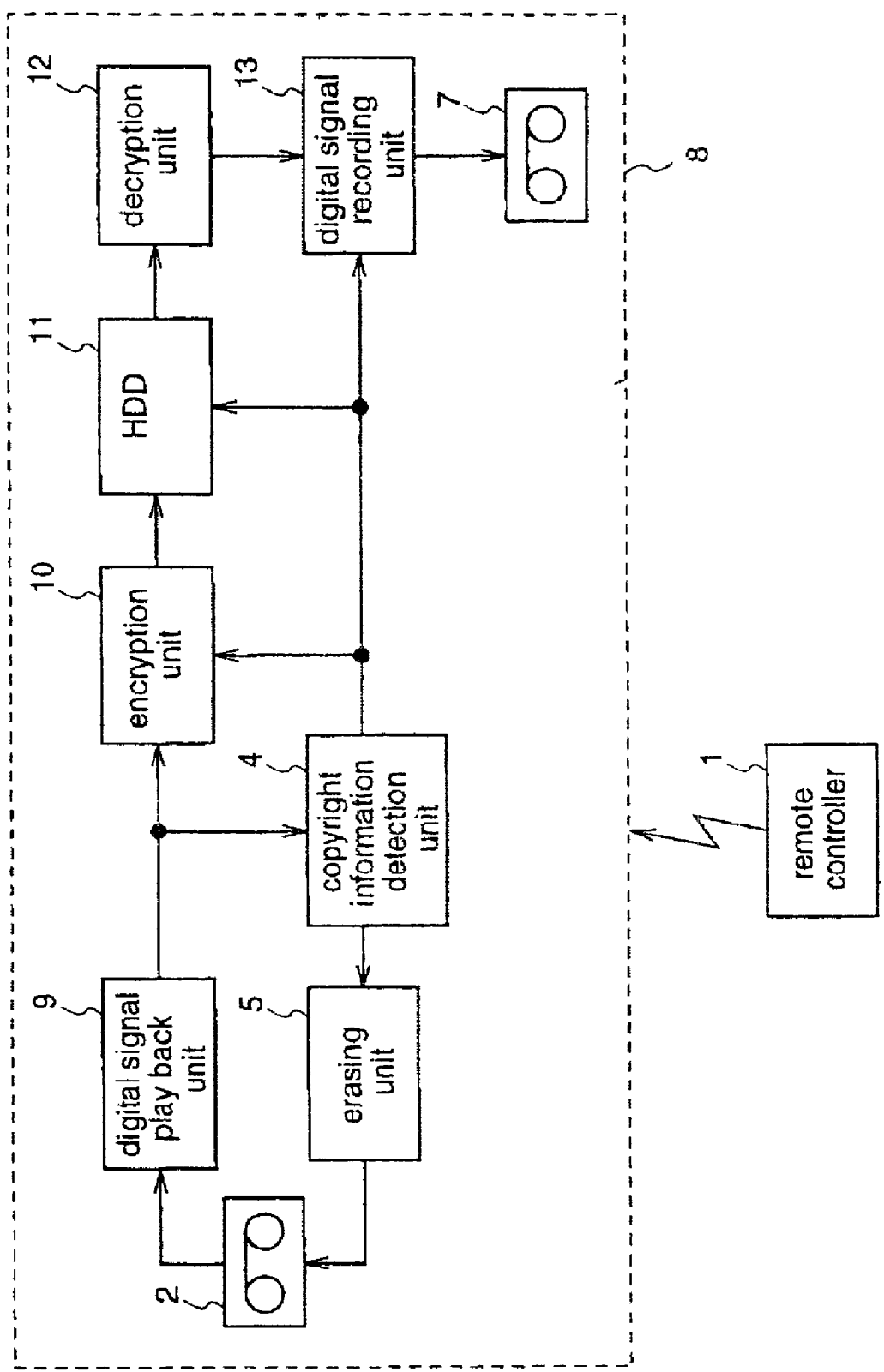
FIG. 2 is a block diagram illustrating a playback/recording apparatus according to a second embodiment of the present invention.

FIG. 2 is a block diagram of a playback/recording apparatus according to the second embodiment. In FIG. 2, a playback/recording apparatus 8 is composed of an erasable video cassette tape 2 on which contents are recorded, a video cassette tape 7 to which the contents are to be transferred, a copyright information detection unit 4, an erasing unit 5, a digital signal playback unit 9, an encryption unit 10, an HDD (hard disk drive) 11, a decryption unit 12, and a digital signal recording unit 13. When the apparatus 8 receives an instruction for transferring the contents, from a remote controller 1 which is a transfer instruction means, the apparatus 8 transfers the contents recorded on the erasable video cassette tape 2 to another video cassette tape 7. The same constituents as those of the above-described embodiment are given the same reference numerals and, therefore, descriptions thereof will be omitted hereinafter.

The digital signal playback unit 9 reproduces an MPEG stream which is digital-recorded on the erasable video cassette tape 2.

The encryption unit 10 encrypts the MPEG stream reproduced by the digital signal playback unit 9, and outputs the encrypted MPEG stream.

The HDD 11 temporarily stores the MPEG stream encrypted by the encryption unit 10.

The decryption unit 12 decrypts the encrypted MPEG stream from the HDD 11, and outputs the decrypted MPEG stream. At this time, the HDD 11 outputs the MPEG stream to the decryption unit 12 and, simultaneously, erases the data.

The digital signal recording unit 13 digital-records the MPEG stream outputted from the decryption unit 12, on the video cassette tape 7.

Next, the operation of the playback/recording apparatus according to the second embodiment will be described.

When the playback/recording apparatus 8 receives an instruction for transferring the contents, from the remote controller 1, the digital signal playback unit 9 reproduces the MPEG stream which is digital-recorded on the erasable video cassette tape 2, and outputs it to the copyright information detection unit 4. The copyright information detection unit 4 detects the copyright information of the MPEG stream outputted from the digital signal playback unit 9, and judges whether the contents are copy-inhibited or not.

When the copyright information detection unit 4 judges that the contents on the video cassette tape 2 are copy-inhibited, the MPEG stream reproduced by the digital signal playback unit 9 is encrypted by the encryption unit 10, and the encrypted stream is temporarily stored in the HDD 11. Further, the erasing unit 5 immediately erases the MPEG stream reproduced by the digital signal playback unit 9 from the video cassette tape 2.

After erasing the signal, the video cassette tape 2 is ejected from the playback/recording apparatus 8, and the video cassette tape 7 is inserted in the playback/recording apparatus 8 (in FIG. 2, both of the cassette tapes 2 and 7 are shown for convenience in description). Then, the HDD 11 reads the MPEG stream which is temporarily stored, and outputs it to the decryption unit 12. At this time, the HDD 11 outputs the encrypted MPEG stream and, simultaneously, erases the data. The encrypted MPEG stream outputted from the HDD 11 is decrypted by the decryption unit 12, and the decrypted MPEG stream is digital-recorded on the video cassette tape 7 in the digital signal recording unit 13.

As described above, in the playback/recording apparatus according to the second embodiment, when the copyright information of the contents which are digital-recorded on the erasable video cassette tape 2 is "copy-inhibited", the contents which include the copyright information indicating "copy-inhibited" and are in the copy-inhibited state are erased from the video cassette tape 2 and, simultaneously, recorded on the other video cassette tape 7. Therefore, the copy-inhibited contents which are digital-recorded on the video cassette tape 2 can be transferred to the other video cassette tape 7 while avoiding that the same contents exist at the same time.

Hereinafter, a third embodiment of the present invention will be described.

Figure 3:
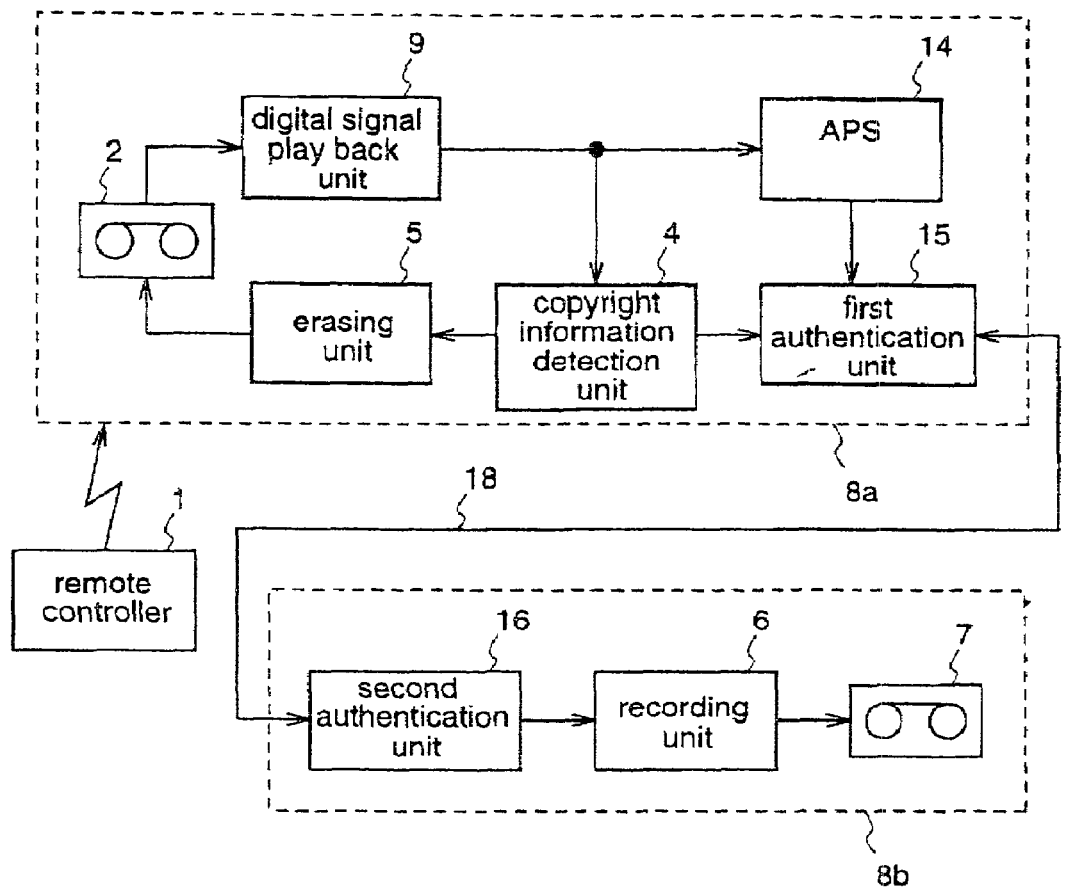
FIG. 3 is a block diagram illustrating a playback/recording apparatus according to a third embodiment of the present invention.
Figure 4:
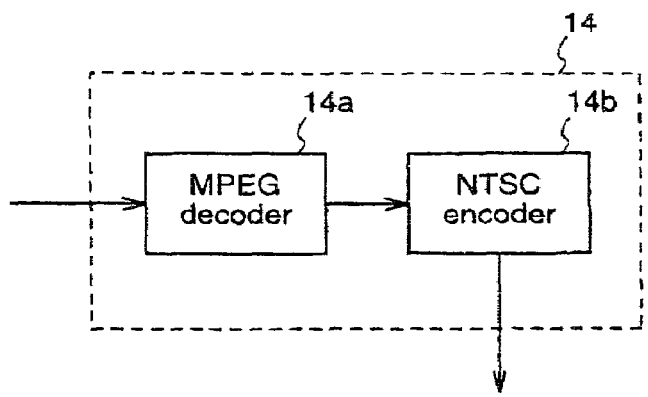
FIG. 4 is a block diagram illustrating an APS in the playback/recording apparatus according to the third embodiment of the present invention.

Initially, the structure of a playback/recording apparatus according to the third embodiment will be described with reference to FIGS. 3 and 4. FIGS. 3 and 4 are block diagrams illustrating a playback/recording apparatus according to the third embodiment. In FIGS. 3 and 4, the playback/recording apparatus is composed of a playback/erasing apparatus 8a as a first apparatus which receives an instruction for transferring the contents, from a remote controller 1 that is a transfer instruction means, a recording apparatus 8b as a second apparatus, and a transmission cable 18 connecting these apparatuses 8a and 8b. The first apparatus 8a is composed of an erasable video cassette tape 2 on which contents are recorded, a copyright information detection unit 4, an erasing unit 5, a digital signal playback unit 9, an APS (analog protection system) 14, and a first authentication unit 15. The second apparatus 8b is composed of a recording unit 6, a video cassette tape 7 to which the contents are to be transferred, and a second authentication unit 16. The same constituents as those of the above-described embodiment are given the same reference numerals and, therefore, descriptions thereof will be omitted hereinafter.

The APS 14 comprises an MPEG decoder 14a and an NTSC encoder 14b, wherein the MPEG decoder 14a MPEG-decodes an MPEG stream which is outputted from the digital signal playback unit 9, and the NTSC encoder 14b generates an audio signal and an NTSC video signal to be outputted.

The transmission cable 18 is a cable for transmitting an analog audio signal and an analog video signal.

The first authentication unit 15 and the second authentication unit 16 exchange ID information through the transmission cable 18, thereby performing mutual authentication. This mutual authentication is carried out employing an existing bi-directional communication method which uses a vertical blanking period of a video signal. Each of the first authentication unit 15 and the second authentication unit 16 forms a code, transfers the code to the authentication unit on the other end, and receives a return code. When the return code is identical to an expected code, the authentication unit recognizes that the authentication unit on the other end is a unit to which the contents can be transferred. Further, the first authentication unit 15 and the second authentication unit 16 also perform transmission and reception of the moved contents.

Next, the operation of the playback/recording apparatus according to the third embodiment will be described.

When the first apparatus 8a receives an instruction for transferring the contents, from the remote controller 1, the first authentication unit 15 and the second authentication unit 16 perform mutual authentication through the transmission cable 18.

The digital signal playback unit 9 reads the MPEG stream which is digital-recorded on the video cassette tape 2, and outputs it to the copyright information detection unit 4. Then, the copyright information detection unit 4 detects the copyright information of the MPEG stream outputted from the digital signal playback unit 9, and judges whether the contents are copy-inhibited or not.

When it is judged by the copyright information detection unit 4 that the contents on the video cassette tape 2 are copy-inhibited, the MPEG stream read by the digital signal playback unit 9 is inputted to the APS 14, and MPEG-decoded by the MPEG decoder 14a, and encoded by the NTSC encoder 14b, thereby obtaining an audio signal and an NTSC video signal. At this time, the NTSC encoder 14b subjects the video signal to analog protection, and superimposes copy generation management system (CGMS) information on the 20th line of the video signal as shown in FIGS. 5(a) and 5(b) and, thereafter, outputs the video signal.

Figure 5:
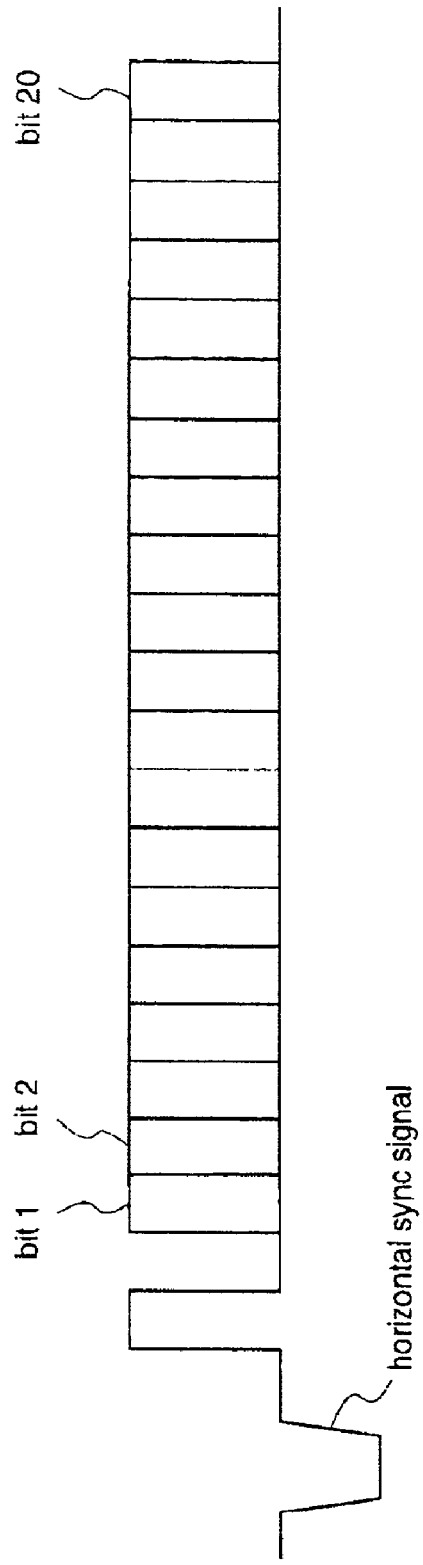
FIG. 5 is a waveform diagram illustrating CGMS information according to the third embodiment of the present invention.

Hereinafter, a description will be given of the CGMS information to be superimposed on the 20th line of the video signal in the NTSC encoder 14b according to the third embodiment, with reference to FIG. 5. FIG. 5 is a diagram illustrating the waveform of the CGMS information according to the third embodiment. The CGMS information shown in FIG. 5(b) is superimposed on the 20th line of the video signal shown in FIG. 5(a). Transfer information is newly defined in bits 12 and 13 of the CGMS information, and information indicating whether transfer of the contents is to be permitted or not is assigned to the bit 12 while information indicating whether the contents are being transferred or not is assigned to the bit 13.

Further, the erasing unit 5 erases the MPEG stream reproduced by the digital signal playback unit 9 from the video cassette tape 2 simultaneously with playback of the MPEG stream.

The video signal and audio signal generated by the APS 14 are transferred to the second apparatus 8b through the first authentication unit 15 and the transmission cable 18. Thereafter, in the second authentication unit 16, the CGMS information superimposed on the video signal is detected. When the transfer permission on the bit 12 of the CGMS information is "1", i.e., "permitted" and the transfer information on the bit 13 is "1", i.e., "being transferred", the CGMS information is recorded on the video cassette tape 7 in the recording unit 6, in like manner as described for the first embodiment. At the same time, the recording unit 6 records the CGMS information in which the bit 13 is "0", i.e., the transfer information indicates only playback, on the video cassette tape 7, as well as the video signal and the audio signal.

As described above, in the playback/recording apparatus according to the third embodiment, when the copyright information of the contents which are digital-recorded on the erasable video cassette tape 2 is "copy-inhibited", the contents which include the copyright information indicating "copy-inhibited" and are in the copy-inhibited state are erased from the video cassette tape 2 and, simultaneously, the contents are converted into an analog signal and transferred by using transfer information or the like and, thereafter, the analog signal is recorded on the other video cassette tape 7. Thereby, the copy-inhibited contents which are digital-recorded on the video cassette tape 2 can be transferred as an analog signal to the other video cassette tape 7 while avoiding that the same contents exist at the same time.

Further, since the authentication units are provided, the contents recorded on the storage medium can be transferred between plural playback/recording apparatuses.

While in this third embodiment the copy generation management system (CGMS) information is superimposed on the 20th line of the video signal by the APS 14, the CGMS information may be superimposed on any line as long as it is in the vertical blanking period of the video signal.

Furthermore, while in this third embodiment transfer of the digital-recorded contents is described, when transfer of analog-recorded contents is carried out, the digital signal playback unit 9 should be replaced with the playback unit 3 and the APS 14 is removed (not shown), whereby transfer of the analog-recorded contents is realized.

Hereinafter, a fourth embodiment of the present invention will be described.

Figure 6:
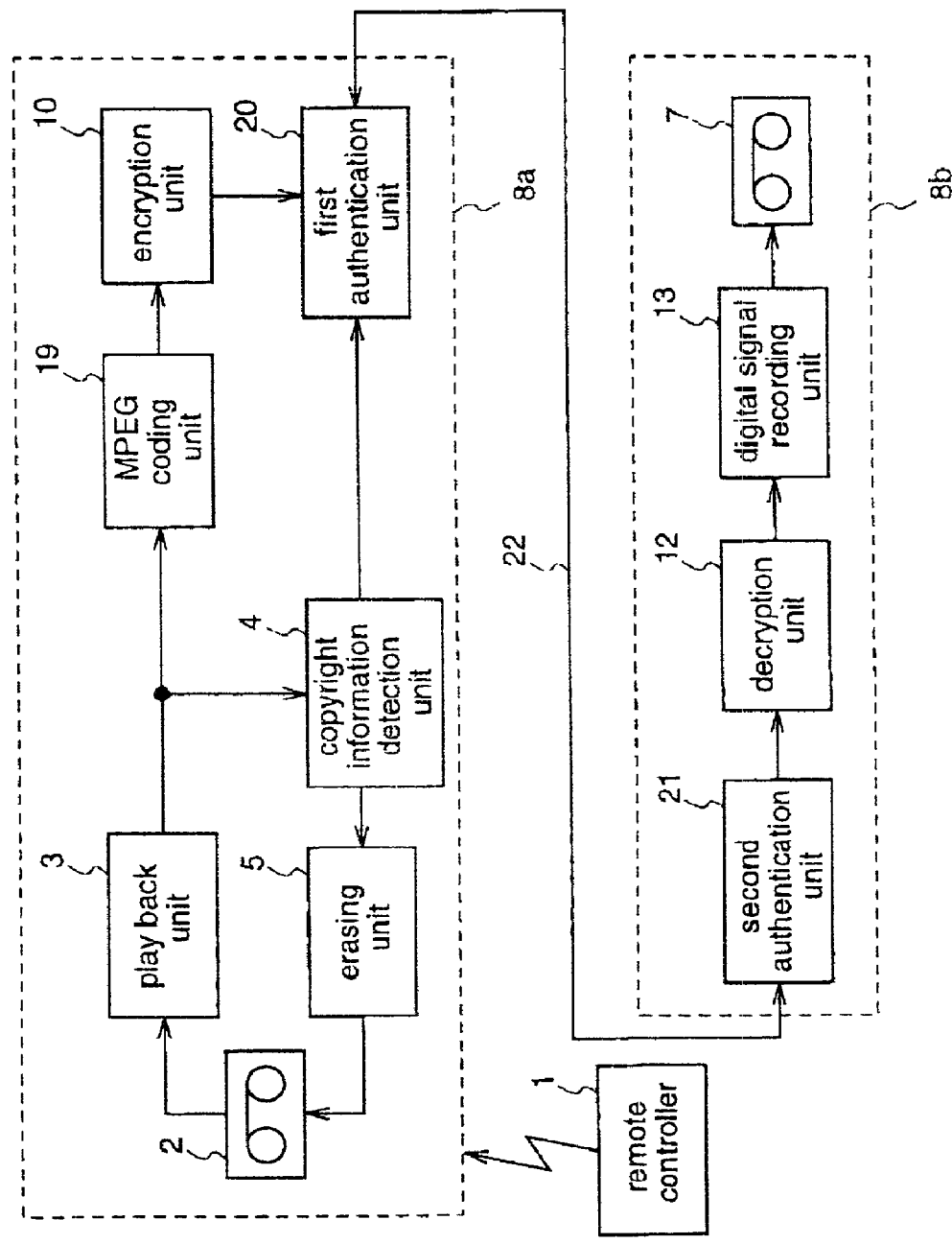
FIG. 6 is a block diagram illustrating a playback/recording apparatus according to a sixth embodiment of the present invention.
Figure 7:
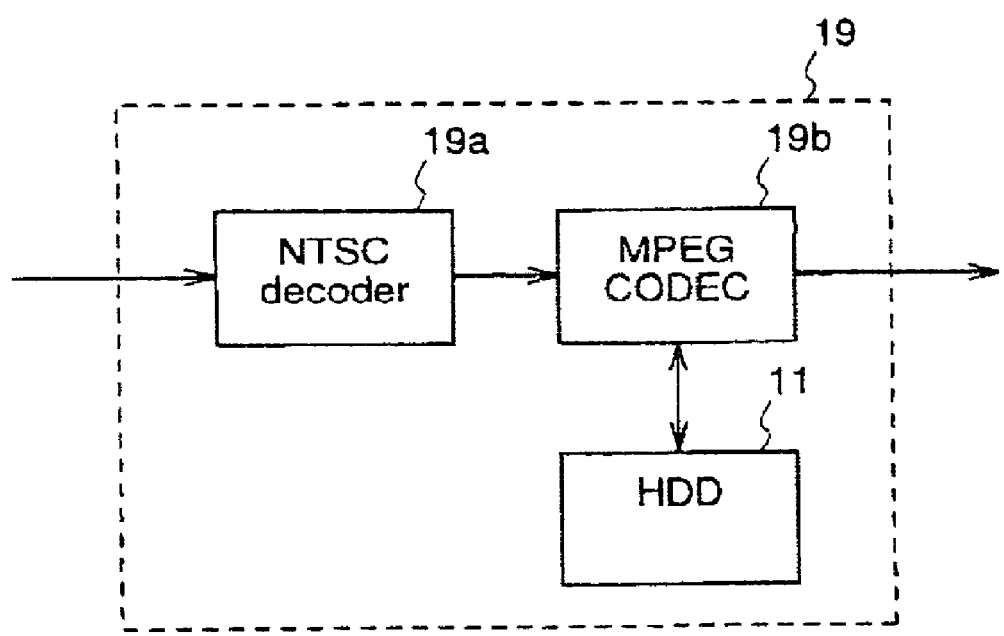
FIG. 7 is a block diagram illustrating an MPEG coding unit in the playback/recording apparatus according to the fourth embodiment of the present invention.

Initially, the structure of a playback/recording apparatus according to the fourth embodiment will be described with reference to FIGS. 6 and 7. FIGS. 6 and 7 are block diagrams illustrating the playback/recording apparatus according to the fourth embodiment. As shown in FIGS. 6 and 7, the playback/recording apparatus is composed of a playback/erasing apparatus 8a which is a first apparatus receiving an instruction for transferring contents, from a remote controller 1, a recording apparatus 8b as a second unit, and a transmission cable 22 connecting these apparatuses 8a and 8b. The first apparatus 8a is composed of an erasable video cassette tape 2 on which contents are recorded, a copyright information detection unit 4, an erasing unit 5, an MPEG coding unit 19, an encryption unit 10, and a first authentication unit 20. The second apparatus 8b is composed of a second authentication unit 21, a decryption unit 12, a digital signal recording unit 13, and a video cassette tape 7 to which the contents are to be transferred. The same constituents as those of the above-described embodiment are given the same reference numerals, and descriptions thereof will be omitted hereinafter.

The MPEG coding unit 19 comprises an NTSC decoder 19a, an MPEG CODEC 19b, and an HDD 11, wherein an audio signal and a video signal outputted from the playback unit 3 are converted into digital data by the NTSC decoder 19a and, thereafter, the digital data is subjected to MPEG compression by the MPEG CODEC 19b and temporarily stored in the HDD 11 for continuous and efficient transfer.

The encryption unit 10 encrypts the MPEG-compressed data outputted from the HDD 11, and outputs the data together with an encryption key to the transmission cable 22. Further, the HDD 11 outputs the temporarily-stored MPEG stream and, simultaneously, erases it.

The transmission cable 22 is a cable for digital signals, which transmits digital data.

The first authentication unit 20 and the second authentication unit 21 perform mutual authentication through the transmission cable 22, and perform transfer of the contents when authentication is established. The mutual authentication is carried out in the same way as described for the third embodiment.

Next, a description will be given of the operation of the playback/recording apparatus according to the fourth embodiment.

When the first apparatus 8a receives an instruction for transferring the contents, from a remote controller 1, the first authentication unit 20 and the second authentication unit 21 perform mutual authentication through the transmission cable 22.

This mutual authentication is identical to that described for the third embodiment, and transfer of the contents is carried out when authentication is established.

The playback unit 3 reproduces the contents recorded on the erasable video cassette tape 2, and outputs the contents to the copyright information detection unit 4. The copyright information detection unit 4 judges whether the contents are copy-inhibited or not, in the same way as described for the first embodiment.

When the copyright information detection unit 4 judges that the contents on the video cassette tape 2 are copy-inhibited, the video signal and the audio signal reproduced in the playback unit 3 are outputted to the MPEG coding unit 19. In the MPEG coding unit 19, these signals are converted into digital data, by the NTSC decoder 19a, and the digital data are MPEG-compressed by the MPEG CODEC 19b and temporarily stored in the HDD 11 for continuous and efficient transfer. The MPEG-compressed data are encrypted by the encryption unit 10, and outputted together with an encryption key. At this time, the HDD 11 outputs the temporarily-stored MPEG-compressed data and, simultaneously, erases the data.

Further, the erasing unit 5 erases the signal reproduced by the playback unit 3, from the video cassette tape 2, simultaneously with playback of the signal.

The encrypted compressed data outputted from the encryption unit 10, and the encryption key to be used for decrypting the data are transferred from the first authentication unit 20, through the transmission cable 22, to the second authentication unit 21. The decryption unit 12 decrypts the encrypted data on the basis of the encryption key, and outputs the decrypted data to the digital signal recording unit 13. The encryption by the encryption unit 10 and the decryption by the decryption unit 12 are carried out employing existing methods.

The MPEG stream inputted to the digital signal recording unit 13 is digital-recorded on the video cassette tape 7, in the same way as described for the second embodiment.

By the way, the mutual authentication by the first authentication unit 20 and the second authentication unit 21 is carried out even while the contents are being transferred, and the transfer of the contents is continued when mutual authentication is established.

As described above, in the playback/recording apparatus according to the fourth embodiment, when the copyright information of the contents which are analog-recorded on the erasable video cassette tape 2 is "copy-inhibited", the contents which include the copyright information indicating "copy-inhibited" and are in the copy-inhibited state are erased from the video cassette tape 2 and, simultaneously, the contents are converted into a digital signal, and the digital signal is recorded on the other video cassette tape 7. Thereby, the copy-inhibited contents which are analog-recorded on the video cassette tape 2 can be converted into the digital signal and transferred to the other video cassette tape 7, while avoiding that the same contents exist at the same time.

While in this fourth embodiment the encryption unit 10 outputs the encryption key, the encryption unit 10 may receive an encryption key which is generated by the decryption unit 12 and outputted through the transmission cable 22, to encrypt the contents using the encryption key.

Hereinafter, a fifth embodiment of the present invention will be described.

Figure 8:
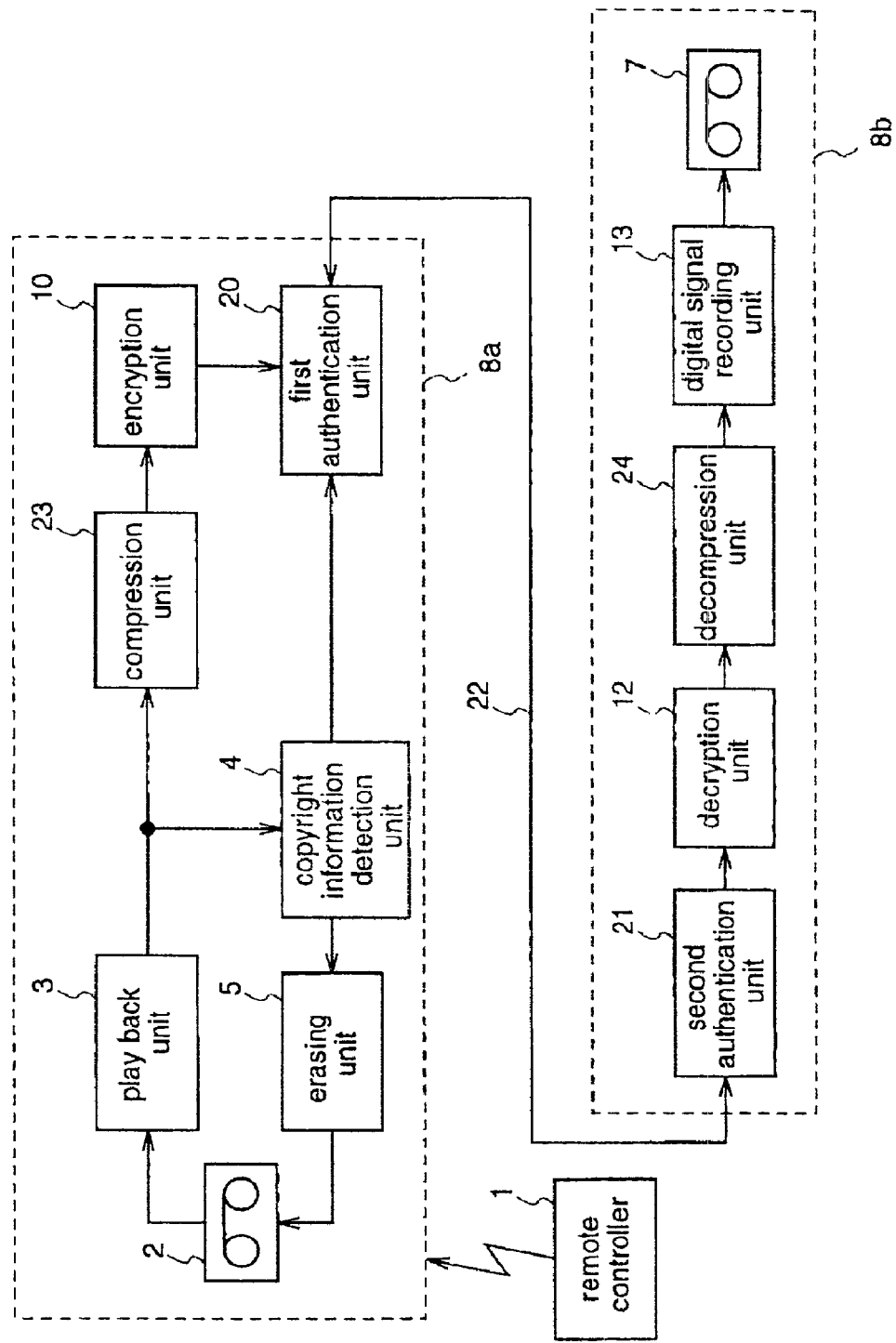
FIG. 8 is a block diagram illustrating a playback/recording apparatus according to a fifth embodiment of the present invention.

Initially, the structure of a playback/recording apparatus according to the fifth embodiment will be described with reference to FIG. 8. FIG. 8 is a block diagram illustrating a playback/recording apparatus according to the fifth embodiment. In FIG. 8, the playback/recording apparatus is composed of a playback/erasing apparatus 8a which is a first apparatus receiving an instruction for transferring contents, from a remote controller 1 that is a transfer instruction means, a recording apparatus 8b as a second unit, and a transmission cable 22 connecting these apparatuses 8a and 8b. The first apparatus 8a is composed of an erasable video cassette tape 2 on which contents are recorded, a playback unit 3, a copyright information detection unit 4, an erasing unit 5, a compression unit 23, an encryption unit 10, and a first authentication unit 20. The second apparatus 8b is composed of a second authentication unit 21, a decryption unit 12, a decompression unit 24, a digital signal recording unit 13, and a video cassette tape 7 to which the contents are to be transferred. The same constituents as those of the above-described embodiment are given the same reference numerals, and descriptions thereof will be omitted hereinafter.

The compression unit 23 compresses image data of the contents, and inserts additional information, such as copyright information and transfer information, in an area obtained by the compression.

The decompression unit 24 decompresses the image data of the contents which are compressed by the compression unit 23, and outputs the original image data before compression.

Hereinafter, a description will be given of an image data compression method and an image data decompression method.

First of all, a compression method will be described. The compression unit 23 performs compression as follows. In image data in which the total number of values to be used as pixel values of image data is less than the total number of values expressed by the number N of bits per pixel, i.e., in image data having values which are not used as pixel values, a certain value G is generated by arranging plural pixel values so as to have digits (the respective pixel values are made to have the same number of digits by adding zero until reaching the maximum number of digits N) and, among values (unused generated values) which include the unused pixel values and are generated by arranging plural pixel values so as to have digits as mentioned above, the total number T of unused generated values which are smaller than the generated value G is subtracted from the generated value G.

Hereinafter, the compression method will be described more specifically, taking an example. Initially, it is assumed that a pixel value is expressed with two bits, and values to be actually used as pixel values are three values of 00, 01, 10 in binary notation, and image data V having three pixels exists. Since each pixel of the image data V is 2 bits, a value which is generated by arranging these three pixel values so as to have digits becomes image data of 6 bits. There is one value which is not used as a pixel value in the image data V, and this value is "11" in binary notation. Accordingly, when the image data V is 00, 01, 10 in binary notation, there is one unused generated value (000011) which is smaller than the generated value 000110 of the image data V, and 000101 (=000110−000001) is obtained as new image data. Further, when the image data V is 00, 10, 10 in binary notation, there are two unused generated values (000011 and 000111) which are smaller than the generated value 001010 of the image data V, and 001000 (=001010−000010) is obtained as new image data. Furthermore, when the image data V is 10, 10, 10 in binary notation, i.e., when each pixel value is the maximum pixel value (10), since there are sixteen unused generated values which are smaller than the generated value 101010 of the image data V, 011010 (=101010−010000) is obtained as new image data. In this way, the 6-bit long image data V is converted into new image data in which the most significant bit is 0, whereby image data compressed to 5-bit length is obtained.

Figure 10:
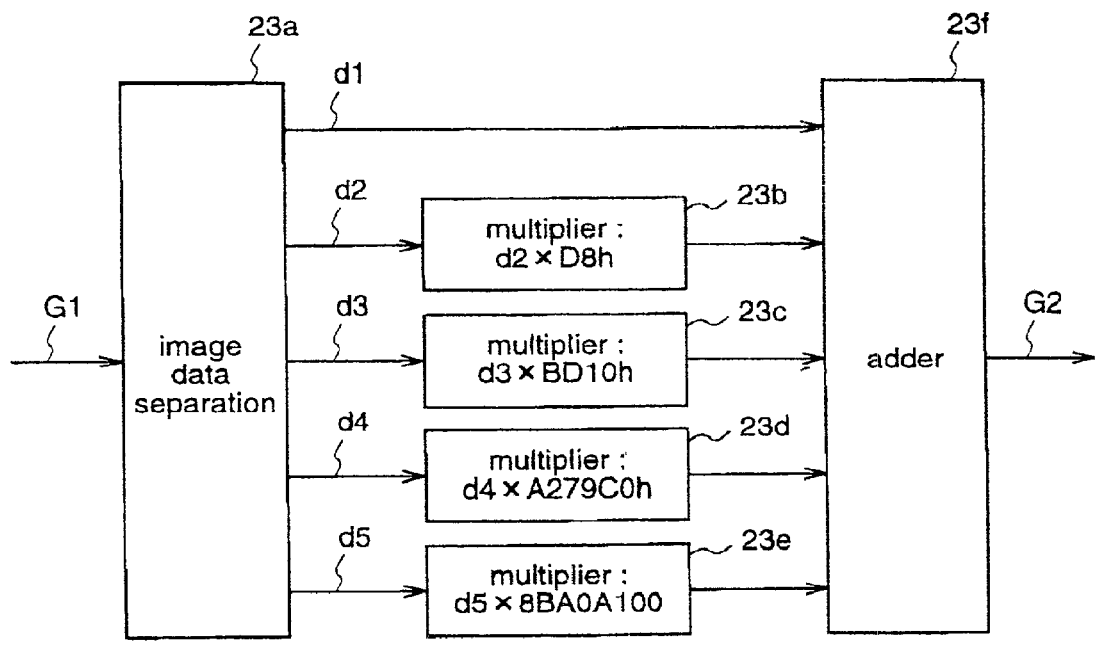
FIG. 10 is a block diagram illustrating a compression unit in the playback/recording apparatus according to the fifth embodiment of the present invention.

Next, a description will be given of the case where image data, which is based on the NTSC system ITU-R601 standard, is expressed with 8 bits, with reference to FIGS. 9 and 10. FIG. 9 shows computational expressions of data compression according to the fifth embodiment, and FIG. 10 is a block diagram illustrating a playback/recording apparatus according to the fifth embodiment. In this case, although luminance values can take any value from 16 to 235 (220 levels of gradation) in decimal notation, 16 is subtracted from all of the luminance values to simplify compression, whereby the range of the luminance values becomes 0 to 210. The quantity of data to be compressed in this case is calculated by obtaining a maximum integer value among x that satisfies an inequality: 720×log220 (720−x)×log256, considering that there are 256 values to be expressed by 8 bits and the number of significant pixels per scanning line is 720, and the maximum integer value is 19. Accordingly, the significant 720 pixels per scanning line can be compressed to 701 (=720−19) pieces of pixel data at maximum. Hereinafter, considering further simplification of calculation, 720 pieces of pixel data are compressed to 702 pieces of pixel data. In this case, data of 18 pixels (18 bytes) are reduced from data of 720 pixels (720 bytes), and this is equivalent to a reduction of 1 bit from 5 pixels (5 bytes=40 bits). Accordingly, compression may be carried out in units of 5 pixels. Assuming that 5 pixel values before compression is d1, d2, d3, d4, and d5, a generated value G1 of d1 to d5, the total number T1 of unused generated values smaller than the generated value G1, and image data G2 after compression are as shown in FIGS. 9(a), 9(b), and 9(c), respectively, Then, the construction for implementing the computational expressions shown in FIG. 9 becomes as shown in FIG. 10, and the block diagram shown in FIG. 10 exists in the compression unit 23, wherein 23a denotes an image data separator, 23b to 23e denote multipliers, and 23f denotes an adder. The image data separator 23a separates the image data G1 into the respective pixels to be output, and the multipliers 23b to 23e perform multiplication by bit-shifting and addition of the respective pixel values. For example, as for D8h×d2, since D8h is 11011000 in binary notation, the sum of a value obtained by bit-extending the d2 and shifting the extended d2 by 7 bits to the left, a value obtained by shifting it by 6 bits, a value obtained by shifting it by 4 bits, and a value obtained by shifting it by 3 bits, is obtained. Other terms are calculated in like manner as described above, and the adder 23f calculates the sum of the results to output the G2. In this way, the compressed data G2 is obtained. Since these calculations are carried out within a predetermined period of time, delays due to compression are not accumulated, and compression can be carried out in synchronization with the image data inputting speed. As described above, the image data (luminance data) based on the NTSC system ITU-R601 standard are compressed in units of 5 pixels.

Next, a general form of the above-described compression method will be described. Assuming that the number of bits of each pixel is M, the number of values to be used actually is U (<the M-th power of 2), the number of data before compression is W1, and the number of data after compression is W2, the quantity of data to be reduced by compression is represented by an integer x that satisfies W1×logU (W1−x)×M×log2. From W1 and x(=W1−W2), the number of pixels (or bits) to be a unit of data compression is calculated, and bit-shifting by bit-extension and addition are repeated to compress the data.

Next, the decompression method will be described. Decompression by the decompression unit 24 is carried out by calculating the total number of unused generated values which are smaller than the generated value G, i.e., the above-mentioned total number T, and then adding it to the generated value G.

Figure 12:
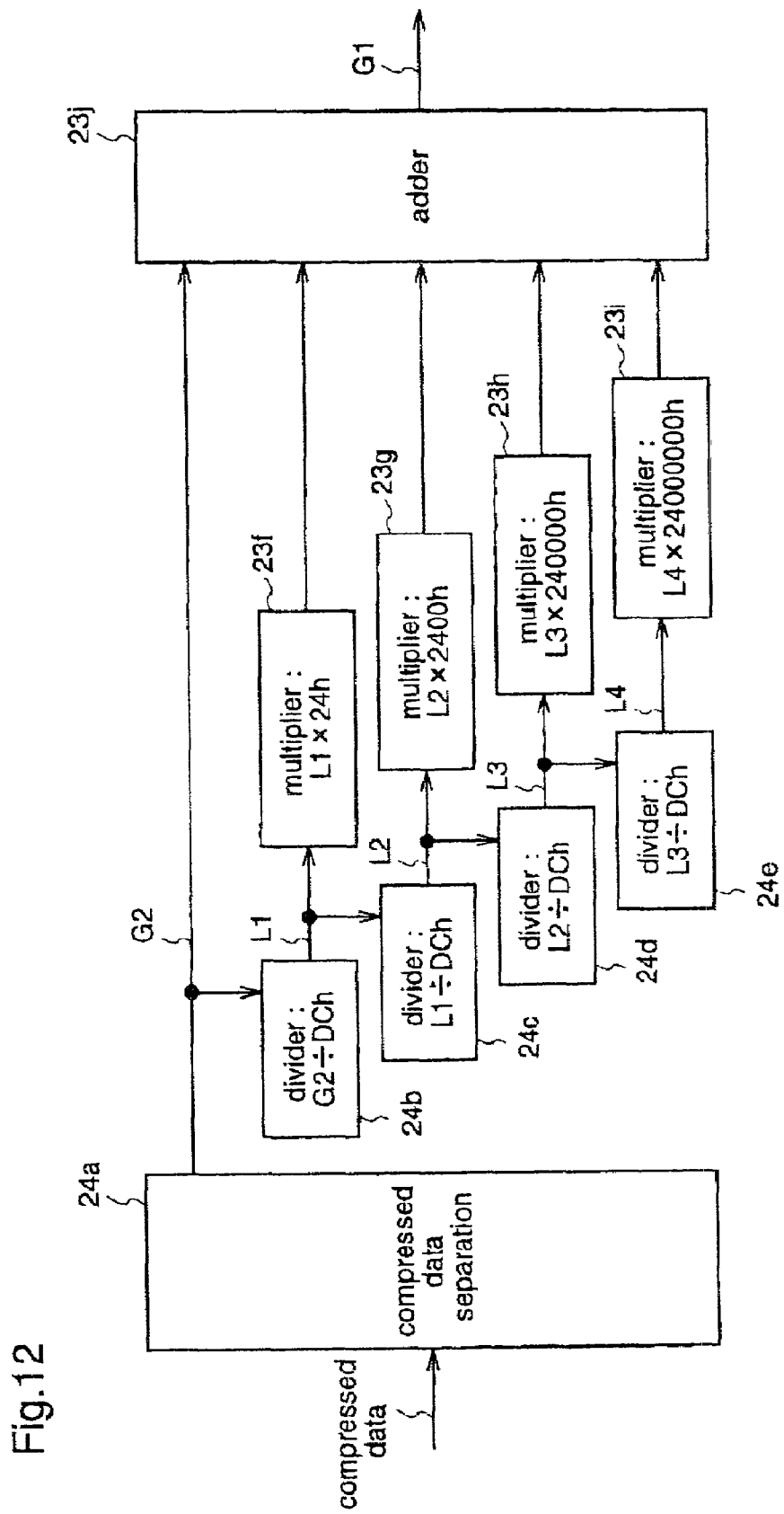
FIG. 12 is a block diagram illustrating a decompression unit in the playback/recording apparatus according to the fifth embodiment of the present invention.

Hereinafter, a description will be given of examples of computational expressions in the case where the data G2 compressed by the compression unit 23 are decompressed, with reference to FIGS. 11 and 12. FIGS. 11(a) and 11(b) show computational expressions for performing decompression of the compressed data G2. The respective quotients shown in FIG. 11(a) are added to the compressed data values G2 as shown in FIG. 11(b), thereby reproducing the pixel data G1 before compression. The construction for implementing the computational expressions shown in FIG. 11 is shown in FIG. 12. The construction shown in FIG. 12 exists in the decompression unit 24, wherein 24a denotes a compressed data decompression unit, 24b to 24e denote dividers, 24f to 24i denote multipliers, and 24j denotes an adder. The compressed data decompression unit 24a successively extracts the compressed data G2 from the inputted compressed data sequence, and outputs the data G2. Each of the dividers 24b and 24e performs division using an existing method such as non-restoring division, and outputs a quotient. Further, each of the multipliers 24f to 24i performs multiplication, and outputs a product. The adder 24j calculates the sum of the outputs of the multipliers 24f to 24i, and outputs the G1. In this way, the data G1 before compression by the compression unit 23 is obtained. Since the above-mentioned calculations are carried out within a predetermined period of time, delays due to decompression are not accumulated, and decompression can be carried out in synchronization with the compressed image data inputting speed.

Next, a general form of the decompression method will be described. As described above, it is assumed that the number of bits of each pixel is M, the number of values to be used actually is U (<the M-th power of 2), the number of data before compression is W1, and the number of data after compression is W2. In this case, the W1 is the sum of the W2 and a value which is obtained by adding the following quotients: a quotient obtained by dividing the W2 with U, a quotient obtained by dividing the quotient with U, a quotient obtained by dividing the quotient with U, . . . which are repeated by the number of times equal to the number of pixels in each compression unit (in this case, 5)−1 (in the case, 4). Thus, data decompression can be performed by repeating bit-shifting and addition. Further, 16, which has been reduced before compression to simplify compression in the compression unit 23, is added to each pixel value of the decompressed image data G1, thereby outputting the original image data.

It is needless to say that the above-described compression and decompression methods can be performed on color-difference data and, further, they are also applicable to digital data other than image data.

Next, the operation of the playback/recording apparatus according to the fifth embodiment will be described.

When the first apparatus 8a receives an instruction for transferring the contents, from the remote controller 1, the first authentication unit 20 and the second authentication unit 21 perform mutual authentication through the transmission cable 22. This mutual authentication is identical to that described for the third embodiment, and transfer of the contents is carried out when authentication is established.

The playback unit 3 reproduces the contents recorded on the erasable video cassette tape 2, and outputs it to the copyright information detection unit 4. The copyright information detection unit 4 detects whether the contents are copy-inhibited or not.

When the copyright information detection unit 4 detects that the contents on the video cassette tape 2 are copy-inhibited, the contents reproduced by the playback unit 3 are outputted to the compression unit 23. In the compression unit 23, the image data of the contents are compressed by the above-mentioned compression method, and additional information such as copyright information and transfer information is inserted in an area secured by the compression. Thereafter, the data of the contents are outputted to the encryption unit 10 and encrypted. Although it is not shown in FIG. 6, a temporary storage unit for temporarily storing the contents data may be provided for continuous and efficient transfer of the contents.

Then, in the erasing unit 5, the contents on the video cassette tape 2 reproduced by the playback unit 3 are erased.

The first authentication unit 20 digital-transfers the encrypted contents data, together with the encryption key and the additional information, through the transmission cable 22 to the second apparatus 8b. The second authentication unit 21 detects the additional information and outputs it, and the second apparatus 8b continues transfer of the contents when it receives the transfer information included in the additional information. The encrypted contents data transferred to the second apparatus 8b are decrypted by the decryption unit 12 on the basis of the encryption key. Further, information as to whether the contents data are compressed by the compression unit 23 or not is also transferred. When the contents data are compressed, the compressed data are decompressed by the decompression unit 24 using the above-mentioned decompression method, and the decompressed contents are digital-recorded on the video cassette tape 7.

As described above, in the playback/recording apparatus according to the fifth embodiment, when the copyright information of the contents which include image data and are recorded on the erasable video cassette tape 2 is "copy-inhibited", the contents including the copyright information indicating "copy-inhibited" and being in the copy-inhibited state are erased from the video cassette tape 2 and, simultaneously, the image data are compressed to secure an area where the additional information is to be inserted and, thereafter, the image data are decompressed and recorded on the other video cassette tape 7. Therefore, the copy-inhibited contents recorded on the video cassette tape 2 can be transferred to the other video cassette tape 7 while avoiding that the same contents exist at the same time.

Hereinafter, a sixth embodiment of the present invention will be described.

Figure 13:
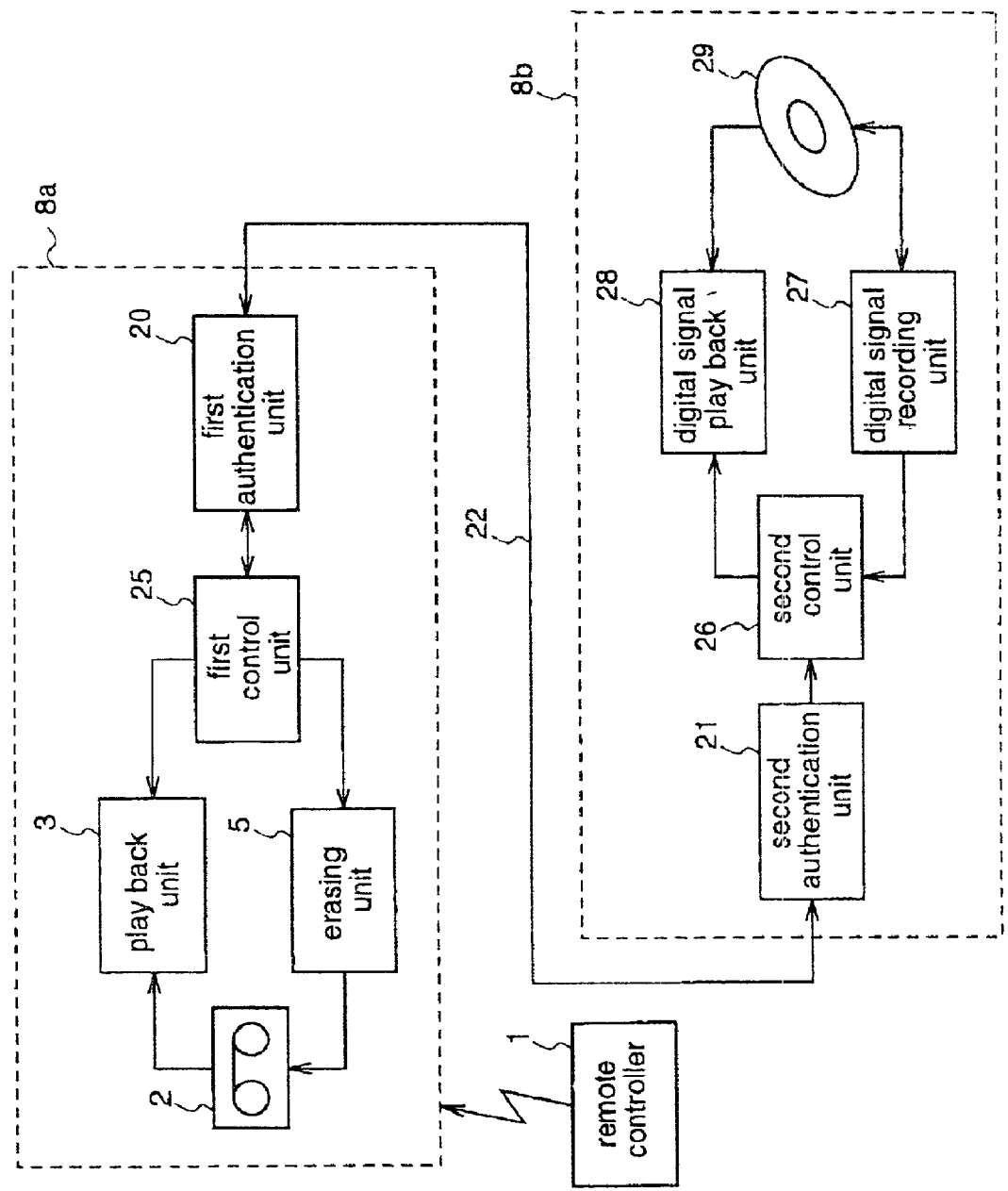
FIG. 13 is a block diagram illustrating a playback/recording apparatus according to the sixth embodiment of the present invention.

Initially, the structure of a playback/recording apparatus according to the sixth embodiment will be described with reference to FIG. 13. FIG. 13 is a block diagram of a playback/recording apparatus according to the sixth embodiment, and the constituents overlapping those of the above-mentioned embodiment with respect to transfer of contents are omitted. In FIG. 13, the playback/recording apparatus is composed of a playback/erasing apparatus 8a which is a first apparatus receiving an instruction for transferring contents, from a remote controller 1 that is a transfer instruction means, a recording apparatus 8b as a second unit, and a transmission cable 22 connecting these apparatuses 8a and 8b. The first apparatus 8a is composed of an erasable video cassette tape 2 on which contents are recorded, a playback unit 3, an erasing unit 5, a first control unit 25, and a first authentication unit 20. The second apparatus 8b is composed of a second authentication unit 21, a second control unit 26, a recording unit 27 for recording a digital signal on a magneto-optic disk, a playback unit 28 for reproducing a digital signal from a magneto-optic disk, and a magneto-optic disk 29 to which the contents of the video cassette tape 2 are to be transferred. The same constituents as those of the above-described embodiment are given the same reference numerals, and descriptions thereof will be omitted hereinafter.

The digital signal recording unit 27 records data of the transferred contents on the magneto-optic disk 29.

The digital signal playback unit 28 reproduces the data of the contents recorded on the magneto-optic disk 29.

The first controller 25 controls the contents transfer process in the first apparatus 8a.

The second controller 26 outputs a result of comparison between the recorded data obtained by the digital signal recording unit 27 and the reproduced data obtained by the digital signal playback unit 28, and controls the contents transfer process in the second apparatus 8b.

Next, the operation of the playback/recording apparatus according to the sixth embodiment will be described.

When the first apparatus 8a receives an instruction for transferring the contents, from the remote controller 1, the first authentication unit 20 and the second authentication unit 21 perform mutual authentication. When it is detected that the contents on the video cassette tape 2 is copy-inhibited, the contents reproduced by the playback unit 3 are converted into digital data or the like, and digital-transferred through the transmission cable 22 to the second apparatus 8b. Further, the contents reproduced by the playback unit 3 are erased in the erasing unit 5.

The digital signal recording unit 27 digital-records the data. of the transferred contents on the magneto-optic disk 29, and the digital signal playback unit 28 reproduces the digital-recorded data. The second control unit 26 performs comparison between the reproduced data obtained by the digital signal playback unit 28 and the recorded data obtained by the digital signal recording unit 27, and outputs a result. Based on the result of the data comparison, when the reproduced data are equal to the recorded data, recording on the magneto-optic disk 29 by the digital signal recording unit 27 is continued. When the reproduced data are not equal to the recorded data, the second control unit 26 stops the transfer process of the second apparatus 8b, and outputs, as the transfer information, occurrence of mismatch and its positional information to the second authentication unit 21. The transfer information is notified through the first authentication unit 20 to the first control unit 25, and the first control unit 25 stops the transfer process of the first apparatus 8a. Thereafter, transfer of the contents is resumed from the position where data recording by the digital signal recording unit 27 was not performed normally, whereby the contents recorded on the video cassette tape 2 can be normally recorded on the video cassette tape 7.

Further, when transferring contents of about two hours which are recorded on the video cassette tape 2, in order to perform efficient transfer, the contents to be transferred are divided in units of, for example, 10 seconds, as an insurance against sudden power-off of the playback/recording apparatus, and the divided contents are continuously transferred. Thereby, stable transfer of contents is achieved. Further, when the above-mentioned resumption of transfer is started from a boundary of the divided contents, stable transfer of contents is realized.

With respect to the division of contents, the playback/recording apparatus of the present invention performs the division of contents by counting a predetermined number of data, employing a clock which is used for another digital processing, time counting, or the like. Further, as for the clock, a clock possessed by each of the first and second apparatuses 8a and 8b may be employed and, even when these clocks have difference frequencies, there occurs no problem because each of the apparatus 8a and 8b counts the number of contents data in itself. Accordingly, the second apparatus 8b successively transfers the section numbers recorded in the digital signal recording unit 27 (e.g., successively assigned count values) as the transfer information to the first apparatus 8a through the first authentication unit 20 and the second authentication unit 21. On receipt of the section information, the first apparatus 8a reproduces the next contents section and outputs it, whereby transfer of the contents can be reliably carried out in units of sections.

Further, in the case where the source of the contents, i.e., the first storage medium, is a storage medium such as a magneto-optic disk, a magnetic disk, or an optical disk (not shown), when the contents are transferred in byte units, the recording position at the destination and the erasing position in the transferred contents can be made the same, whereby transfer of copy-inhibited contents such as a still picture can be carried out appropriately.

Further, information indicating, as contents information, whether transfer of contents is permitted or not may be recorded in the storage medium as a part of copyright information, and this transfer permission/inhibition information may be detected by the copyright information detection unit 4 or the like which is described for the above embodiment, whereby transfer of contents can be controlled on the basis of this information.

Furthermore, information indicating, as contents information, whether or not transfer is to be permitted even when the type of the storage medium (tape, disk, or the like) or the recording mode (digital or analog) differs between the source of the contents and the destination of the contents, may be added as a part of copyright information, or it may be newly assigned to a reservation bit or the like of the CGMS which is described for the third embodiment, whereby a restriction can be placed on transfer of contents, and transfer of contents can be controlled on the basis of the contents information by detecting the information with the copyright information detection unit 4 or the like which is described for the above embodiment.

Furthermore, the contents to be transferred may be already-encrypted contents.

While in this sixth embodiment transfer of contents between two apparatuses which have performed mutual authentication is described, transfer of contents can be carried out similarly also in a playback/recording apparatus where playback, erasing, and recording means exist in a single unit.

As described above, the playback/recording apparatus according to the sixth embodiment can perform transfer of contents with stability.

Next, a seventh embodiment of the present invention will be described.

Figure 14:
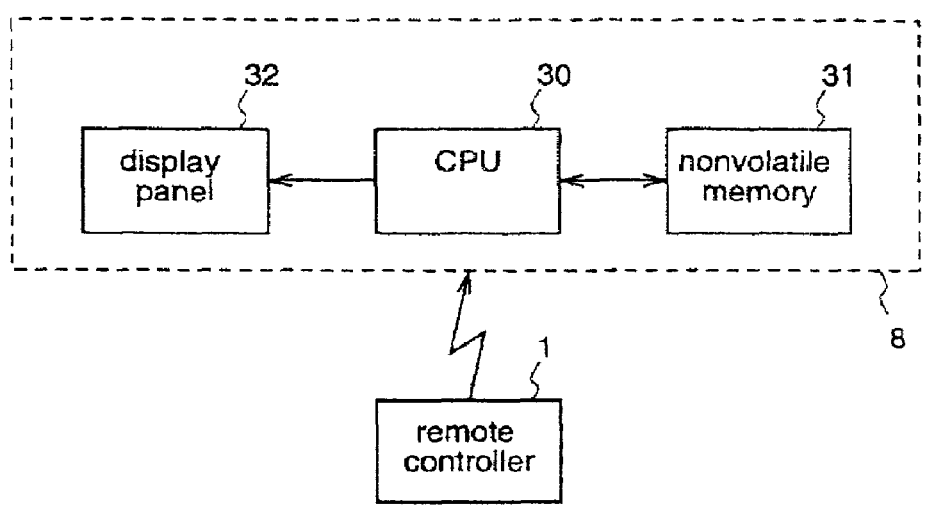
FIG. 14 is a block diagram illustrating a playback/recording apparatus according to a seventh embodiment of the present invention.
Figure 15:
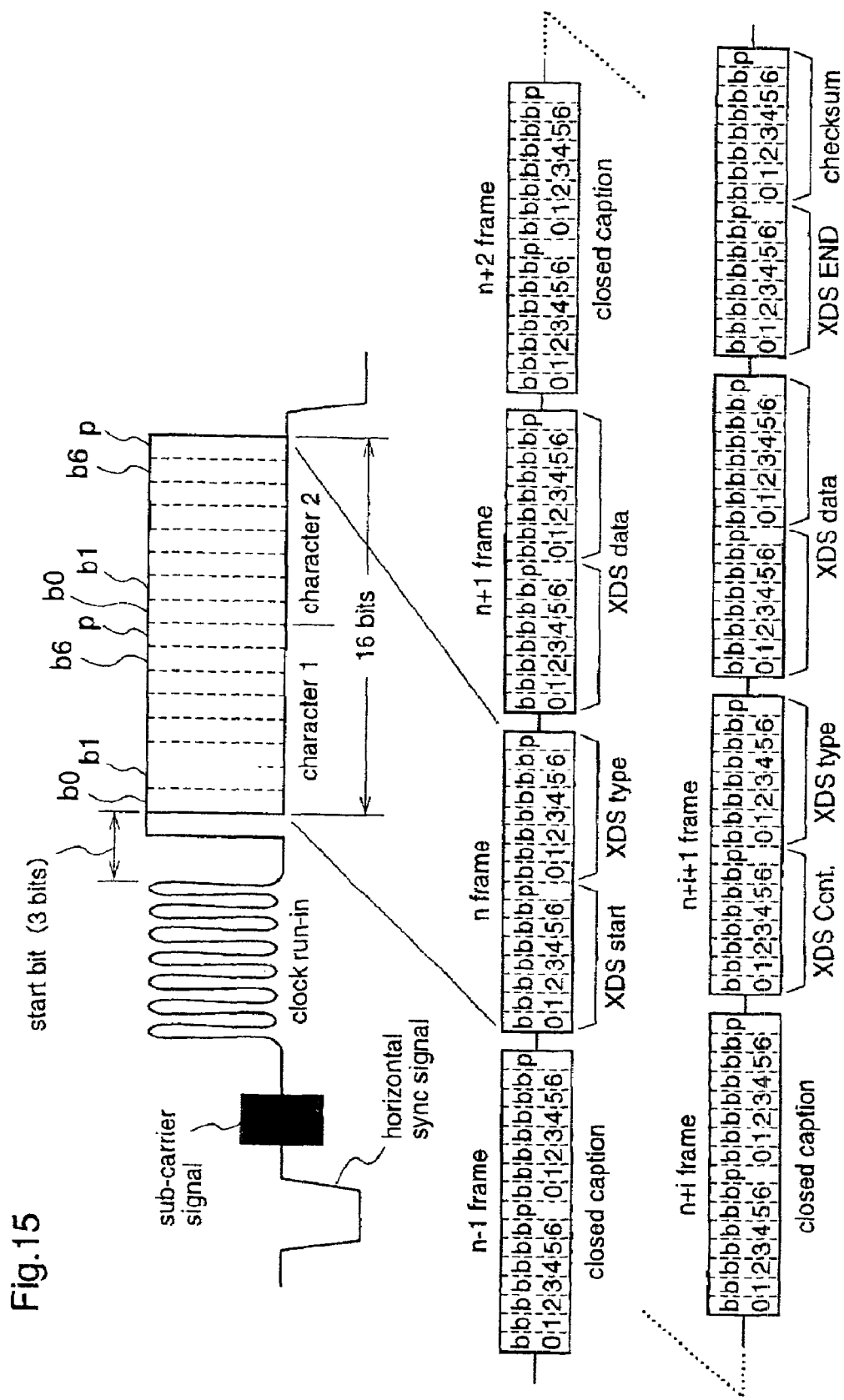
FIG. 15 is a diagram illustrating a signal format for transferring CGMS information according to the prior art.

Initially, the structure of a playback/recording apparatus according to the seventh embodiment will be described with reference to FIG. 14. FIG. 14 is a block diagram illustrating a playback/recording apparatus according to the seventh embodiment, wherein the constituents overlapping those of the above-mentioned embodiment with respect to transfer of contents are omitted. In FIG. 14, a playback/recording apparatus 8 according to the seventh embodiment is composed of a CPU 30, a nonvolatile memory 31, and a display panel 32. When the apparatus 8 receives an instruction for transferring contents, from a remote controller 1 that is a move instruction means, it transfers the contents from an erasable storage medium to another storage medium. The same constituents as those of the above-described embodiment are given the same reference numerals, and descriptions thereof will be omitted hereinafter.

The CPU 30 records information indicating transfer of the contents on the nonvolatile memory 31 and, simultaneously, erases the information.

The nonvolatile memory 31 holds information relating to transfer of contents, such as the transfer information, copyright information, information indicating division of contents, and the like.

The display panel 32 displays the transfer status of the contents to the outside of the apparatus.

Next, the operation of the playback/recording apparatus according to the seventh embodiment will be described.

When the playback/recording apparatus 8 receives an instruction for transferring the contents, from the remote controller 1, the CPU 30 stores the information indicating transfer of the contents in the nonvolatile memory 31, and erases the information from the nonvolatile memory 31 when transfer of the contents is ended. Further, while the contents are being transferred, the display panel 32 displays that the contents are being transferred, to the outside of the apparatus.

While in this seventh embodiment a playback/recording apparatus having playback, erasing, and recording means in a single unit is described, transfer of contents can be carried out similarly also in a playback/recording apparatus having a first apparatus and a second apparatus.

As described above, in the playback/recording apparatus according to the seventh embodiment, even when transfer of contents is interrupted due to power-off of the playback/recording apparatus or the like while the contents are being transferred, the transfer information can be obtained by accessing the nonvolatile memory 31 when the power is turned on again, whereby the transfer of contents can be removed and continued. Further, when the contents are being transferred, a message indicating the transfer is displayed on the display panel, thereby notifying the viewer that the contents are being transferred.

We claim:

1. A playback/recording apparatus for performing transfer of contents recorded on an erasable storage medium, between apparatuses:

said playback/recording apparatus comprising a playback/erasing apparatus as a first apparatus, a recording apparatus as a second apparatus, and a transmission line such as a transmission cable or the like for connecting the first and second apparatuses;

said first apparatus comprising:

a first authentication means for performing mutual authentication and transfer of contents between itself and the second apparatus;

a playback means for reproducing contents recorded on a first storage medium, and outputting the reproduced contents;

a detection means for detecting copyright information of the contents;

an erasing means for erasing the contents from the first storage medium; and an encryption means for encrypting the output from the playback means, and outputting the encrypted data; and said second apparatus comprising:

a second authentication means for performing mutual authentication and transfer of contents between itself and the first apparatus;

a decryption means for decrypting the encrypted data; and a recording means for recording the contents on a second storage means;

wherein, when performing transfer of the contents, mutual authentication is carried out between the first authentication means and the second authentication means, the contents are reproduced by the playback means and outputted and, when the output of the detection means indicates that the contents are copy-inhibited, data of the contents are encrypted by the encryption means and outputted, the contents are erased from the first storage medium by the erasing means, the encrypted data are decrypted by the decryption means and outputted, and the contents are recorded on the second storage means by the recording means, thereby transferring the contents.

2. The playback/recording apparatus defined in claim 1, further comprising a temporary storage means for temporarily storing the contents; wherein the contents are temporarily stored in the temporary storage means.

3. A playback/erasing apparatus as a first apparatus, which is one of components of a playback/recording apparatus for performing transfer of contents recorded on an erasable storage medium, between the first apparatus and a second apparatus, comprising:

a first authentication means for performing mutual authentication and transfer of contents between itself and the second apparatus;

a playback means for reproducing contents recorded on a first storage medium, and outputting the reproduced contents;

a detection means for detecting copyright information of the contents; and an erasing means for erasing the contents from the first storage medium;

wherein, when performing transfer of the contents, mutual authentication is carried out between the first authentication means and the second apparatus, and the contents are reproduced by the playback means and outputted and, when the output of the detection means indicates that the contents are copy-inhibited, the contents are erased from the first storage medium by the erasing means.

4. The playback/erasing apparatus as the first apparatus defined in claim 3, further comprising a first control means for controlling the playback means and the erasing means;

wherein the playback means and the erasing means are controlled by the first control means, thereby performing transfer of the contents.

5. The playback/erasing apparatus as the first apparatus defined in claim 3, wherein mutual authentication by the first authentication means is also carried out during transfer of the contents, and the transfer of the contents is continued when mutual authentication is established.

6. The playback/erasing apparatus as the first apparatus defined in claim 3, further comprising a transfer instruction means for sending an instruction for transferring the contents, to the first apparatus;

wherein transfer of the contents is carried out according to the instruction of the transfer instruction means.

7. A playback/erasing apparatus as a first apparatus, which is one of components of a playback/recording apparatus for performing transfer of contents recorded on an erasable storage medium, between the first apparatus and a second apparatus, comprising:

a first authentication means for performing mutual authentication and transfer of contents between itself and the second apparatus;

a playback means for reproducing contents recorded on a first storage medium, and outputting the reproduced contents;

a detection means for detecting copyright information of the contents;

an erasing means for erasing the contents from the first storage medium; and an encryption means for encrypting the output of the playback means, and outputting the encrypted data;

wherein, when performing transfer of the contents, mutual authentication is carried out between the first authentication means and the second apparatus, and the contents are reproduced by the playback means and outputted and, when the output of the detection means indicates that the contents are copy-inhibited, the data of the contents are encrypted by the encryption means and outputted, and the contents are erased from the first storage medium by the erasing means.

8. The playback/erasing apparatus as the first apparatus defined in claim 7, further comprising a temporary storage means for temporarily storing the contents; wherein the contents are temporarily stored in the temporary storage means.

* * * * *

UNITED STATES PATENT AND TRADEMARK OFFICE
CERTIFICATE OF CORRECTION

PATENT NO.         : 7,587,125 B2
APPLICATION NO.    : 10/031360
DATED              : September 8, 2009
INVENTOR(S)        : Koichi Komoda It is certified that error appears in the above-identified patent and that said Letters Patent is hereby corrected as shown below:

Column 1, line 17, change "hand Led" to --handled--

Column 12, line 50, change "clue" to --due--

Signed and Sealed this

Fifteenth Day of December, 2009

David J. Kappos
*Director of the United States Patent and Trademark Office*